United States Patent
Zhang et al.

(10) Patent No.: US 11,409,885 B2
(45) Date of Patent: Aug. 9, 2022

(54) METHOD AND APPARATUS FOR PROCESSING INFORMATION BY COOPERATION OF MULTIPLE SUBJECTS

(71) Applicant: FUJITSU LIMITED, Kawasaki (JP)

(72) Inventors: Shenbin Zhang, Beijing (CN); Jun Sun, Beijing (CN); Bingfeng Pi, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 642 days.

(21) Appl. No.: 16/452,020

(22) Filed: Jun. 25, 2019

(65) Prior Publication Data
US 2020/0026862 A1    Jan. 23, 2020

(30) Foreign Application Priority Data
Jul. 20, 2018    (CN) .......................... 201810803527.6

(51) Int. Cl.
| | |
|---|---|
| G06F 21/57 | (2013.01) |
| G06F 9/46 | (2006.01) |
| G06F 9/48 | (2006.01) |
| G06F 9/52 | (2006.01) |

(52) U.S. Cl.
CPC ............ G06F 21/577 (2013.01); G06F 9/466 (2013.01); G06F 9/4881 (2013.01); G06F 9/52 (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,661,537 B2 | 2/2014 | Stephens, Jr. | |
| 2017/0316212 A1* | 11/2017 | Tripp | .................... G06F 21/577 |
| 2018/0365414 A1* | 12/2018 | Guarnieri | ............ G06F 16/2379 |
| 2019/0235946 A1 | 8/2019 | Guo et al. | |

FOREIGN PATENT DOCUMENTS

| | | |
|---|---|---|
| CN | 106789095 A | 5/2017 |
| CN | 108182581 A | 6/2019 |

OTHER PUBLICATIONS

Extended European Search Report dated Oct. 23, 2019 in related European Patent Application No. 19166112.3 (7 pages).

* cited by examiner

*Primary Examiner* — Craig C Dorais
(74) *Attorney, Agent, or Firm* — Staas & Halsey LLP

(57) ABSTRACT

Disclosed are a method and apparatus for processing information by cooperation of multiple subjects, by submitting an information processing task to first multiple subjects; performing security analysis on information processing results obtained by executing the information processing task by the first multiple subjects, determining an updated processing manner of executing the information processing task based on a result of the security analysis; and submitting the information processing task to second multiple subjects according to the determined updated processing manner. Information processing results of executing the information processing task by the second multiple subjects are obtained, each of the second multiple subjects and each of the first multiple subjects save same information associated with the information processing task, and the information is updated based on the information processing results of executing the information processing task by the second multiple subjects.

20 Claims, 8 Drawing Sheets

METHOD AND APPARATUS FOR PROCESSING INFORMATION BY COOPERATION OF MULTIPLE SUBJECTS

CROSS-REFERENCE TO RELATED APPLICATIONS

This application claims the priority benefit of Chinese Patent Application No. 201810803527.6, filed on Jul. 20, 2018 in the China National Intellectual Property Administration, the disclosure of which is incorporated herein in its entirety by reference.

FIELD OF THE INVENTION

The present disclosure relates to the field of information processing, and particularly to a method and apparatus for processing information by cooperation of multiple subjects, as well as a method and apparatus for verifying an information processing task in a blockchain.

BACKGROUND OF THE INVENTION

In the technology of processing information by cooperation of multiple subjects, the security of executing an information processing task and the verification of an information processing task are two very important factors.

More particularly, blockchain technology is an example of the above technology of processing information by cooperation of multiple subjects. In recent years, the blockchain technology has been developed rapidly, which benefits from the success in Bitcoin. A block chain, also called a distributed leger, is a structure in which data is saved by multiple nodes which are trustless in each other. All the nodes in the blockchain agree on an order of blocks. Each block contains several pieces of transaction information, and thus the blockchain can be regarded as many transactions which have been sorted. At present, there are several kinds of blockchain frameworks, such as a public chain, a private chain and a consortium chain.

In a traditional consortium chain, it is possible to save distributed ledger information between different enterprises. However, the traditional consortium chain has problems in aspects of the security of executing an information processing task and the verification of an information processing task.

SUMMARY OF THE INVENTION

A brief summary of the present disclosure is given below to provide a basic understanding of some aspects of the present disclosure. However, it should be understood that the summary is not an exhaustive summary of the present disclosure. It does not intend to define a key or important part of the present disclosure, nor does it intend to limit the scope of the present disclosure. The object of the summary is only to briefly present some concepts about the present disclosure, which serves as a preamble of the more detailed description that follows.

In view of the above problems, an object of the present disclosure is to provide a method and apparatus for processing information by cooperation of multiple subjects, as well as a method and apparatus for verifying an information processing task in a blockchain, which are capable of solving one or more defects in the prior art.

According to an aspect of the present disclosure, there is provided a method for processing information by cooperation of multiple subjects, comprising: a first submission step of submitting a specific information processing task to first multiple subjects; a security analysis step of performing security analysis with respect to information processing results obtained by executing the specific information processing task by the first multiple subjects, and determining an updated processing manner of executing the specific information processing task based on a result of the security analysis; and a second submission step of submitting the specific information processing task to second multiple subjects according to the determined updated processing manner, and obtaining information processing results of executing the specific information processing task by the second multiple subjects, wherein each of the second multiple subjects and each of the first multiple subjects save same information associated with the specific information processing task, and the information is updated based on the information processing results of executing the specific information processing task by the second multiple subjects.

According to another aspect of the present disclosure, there is provided an apparatus for processing information by cooperation of multiple subjects, comprising: a first submission unit configured to submit a specific information processing task to first multiple subjects; a security analysis unit configured to perform security analysis with respect to information processing results obtained by executing the specific information processing task by the first multiple subjects, and to determine an updated processing manner of executing the specific information processing task based on a result of the security analysis; and a second submission unit configured to submit the specific information processing task to second multiple subjects according to the determined updated processing manner, and to obtain information processing results of executing the specific information processing task by the second multiple subjects, wherein each of the second multiple subjects and each of the first multiple subjects save same information associated with the specific information processing task, and the information is updated based on the information processing results of executing the specific information processing task by the second multiple subjects.

According to still another aspect of the present disclosure, there is provided a method for verifying an information processing task in a blockchain, which verifies the information processing task in the blockchain based on the second results obtained by the above method for processing information by cooperation of multiple subjects. The method comprises: on each node in the blockchain, performing a judgment as to whether or not the information processing task is valid, based on the second results and a key value database of the node.

According to other aspects of the present disclosure, there is further provided a computer program code and a computer program product for implementing the above method according to the present disclosure, as well as a computer readable storage medium having recorded thereon the computer program code for implementing the above method according to the present disclosure.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure can be better understood with reference to the detailed description given in conjunction with the appended drawings below, wherein throughout the drawings, same or similar reference signs are used to represent same or similar components. The appended drawings, together with the detailed descriptions below, are incorporated in the specification and form a part of the specification, to further describe preferred embodiments of the present disclosure and explain the principles and advantages of the present disclosure by way of examples. In the appended drawings.

EMBODIMENTS OF THE INVENTION

Hereinafter, exemplary embodiments of the present disclosure will be described in detail in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should also be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

Embodiments of the present disclosure will be described in detail in conjunction with the drawings below.

Figure 1:
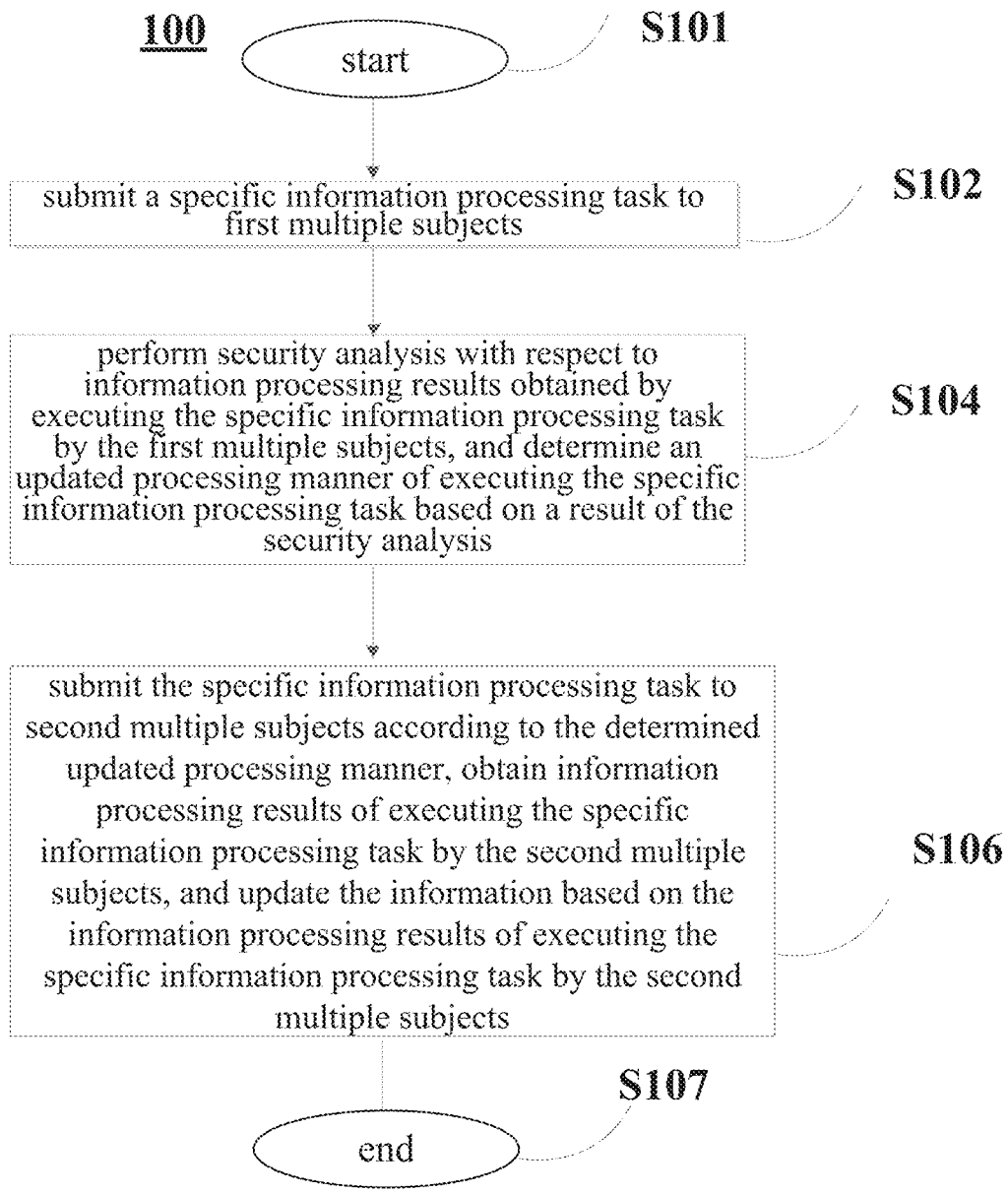
FIG. 1 is a flowchart showing a flow example of a method for processing information by cooperation of multiple subjects according to an embodiment of the present disclosure.

Firstly, a flow example of a method 100 for processing information by cooperation of multiple subjects according to an embodiment of the present disclosure will be described with reference to FIG. 1. FIG. 1 is a flowchart showing a flow example of the method 100 for processing information by cooperation of multiple subjects according to the embodiment of the present disclosure. As shown in FIG. 1, the method 100 for processing information by cooperation of multiple subjects according to the embodiment of the present disclosure comprises a first submission step S102, a security analysis step S104 and a second submission step S106.

The method 100 for processing information by cooperation of multiple subjects according to the embodiment of the present disclosure starts at S101.

In the first submission step S102, it is possible to submit a specific information processing task to first multiple subjects.

As an example, the first multiple subjects may be multiple subjects which are trustless in each other.

In the security analysis step S104, it is possible to perform security analysis with respect to information processing results obtained by executing the specific information processing task by the first multiple subjects, and to determine an updated processing manner of executing the specific information processing task based on a result of the security analysis.

As an example, in the security analysis step S104, if the security analysis represents existence of a security risk, an updated processing manner of executing the specific information processing task is determined.

In the second submission step S106, the specific information processing task is submitted to second multiple subjects according to the determined updated processing manner, and information processing results of executing the specific information processing task by the second multiple subjects are obtained, wherein each of the second multiple subjects and each of the first multiple subjects save same information associated with the specific information processing task, and the information is updated based on the information processing results of executing the specific information processing task by the second multiple subjects.

As an example, in the second submission step S106, the specific information processing task is submitted to second multiple subjects, but not to the first multiple subjects, according to the determined updated processing manner.

The method 100 for processing information by cooperation of multiple subjects according to the embodiment of the present disclosure ends at S107.

In the method 100 for processing information by cooperation of multiple subjects according to the embodiment of the present disclosure, it is possible to improve the security of executing an information processing task by performing security analysis with respect to information processing results obtained by executing the specific information processing task by the first multiple subjects, and determining an updated processing manner of executing the specific information processing task based on a result of the security analysis.

Figure 2:
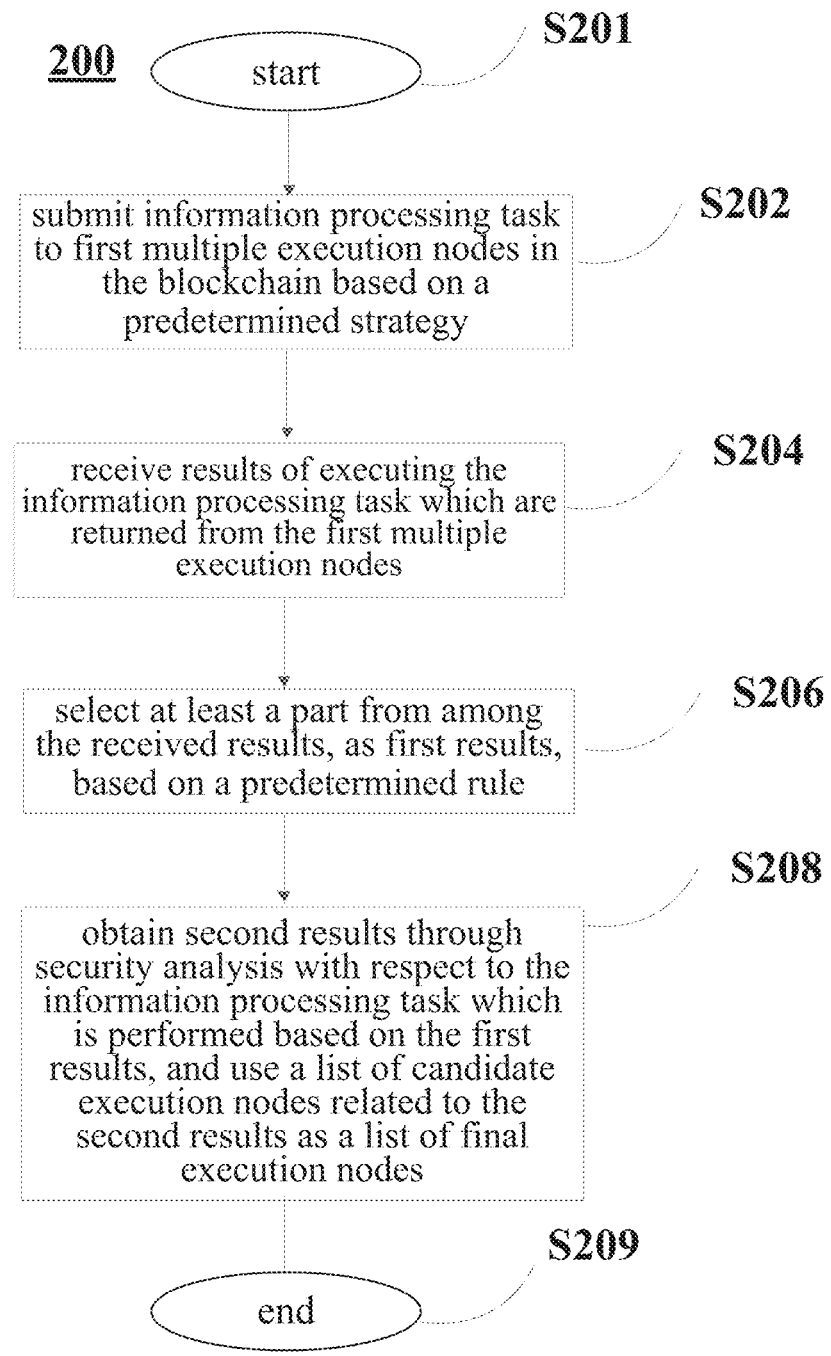
FIG. 2 is a flowchart showing a flow example of a method for generating a list of final execution nodes for an information processing task in a blockchain according to an embodiment of the present disclosure.

Preferably, the specific information processing task is an information processing task associated with a blockchian, and the first multiple subjects and the second multiple subjects are execution nodes to which the blockchain relates. The method 100 for processing information by cooperation of multiple subjects according to the embodiment of the present disclosure can be embodied as a method 200 for generating a list of final execution nodes for an information processing task in a blockchain. FIG. 2 is a flowchart showing a flow example of the method 200 for generating a list of final execution nodes for an information processing task in a blockchain according to an embodiment of the present disclosure. As shown in FIG. 2, the method 200 for generating a list of final execution nodes for an information processing task in a blockchain according to the embodiment of the present disclosure comprises an information processing task submission step S202, a result reception step S204, a first result selection step S206 and a second result obtainment step S208. The first submission step S102 in the method 100 for processing information by cooperation of multiple subjects according to the embodiment of the present disclosure includes the processing executed in the information processing task submission step S202. The security analysis step S104 and the second submission step S106 in the method 100 for processing information by cooperation of multiple subjects according to the embodiment of the present disclosure include the processing executed in the result reception step S204, the first result selection step S206 and the second result obtainment step S208.

The method 200 for generating a list of final execution nodes for an information processing task in a blockchain according to the embodiment of the present disclosure starts at S201.

In the information processing task submission step S202, it is possible to submit the information processing task to first multiple execution nodes in the blockchain based on a predetermined strategy, wherein the first multiple subjects correspond to the first multiple execution nodes.

As an example but not a limitation, one or more organization nodes exist in the blockchain, each organization node comprising multiple nodes, the multiple nodes comprising multiple execution nodes. When a user desires to perform an information processing task (for example, to perform a transaction) in the blockchain, the user can submit the information processing task to first multiple execution nodes in the blockchain based on a predetermined strategy. Hereinafter, the user may be called a node which submits the information processing task.

The predetermined strategy may be a strategy determined in advance. For example, the predetermined strategy may be a strategy determined in advance according to an execution history of same or similar information processing tasks.

As an example, the predetermined strategy may be defined as follows:

AND(m1 of org1,m2 of org2)

The above strategy means: to acquire m1 execution results of the information processing task from an organization node 1 org 1 and to acquire m2 execution results of the information processing task from an organization node 2 org 2. The execution results of the information processing task contain signatures as well as read sets and write sets (R sets/W sets). The read sets and the write sets are composed of many key value pairs, such as ('id'=>'jack', 'balance'=>30).

As an example, in the information processing task submission step S202, the information processing task is submitted to the m1 execution nodes in the organization node 1 org 1 and the m2 execution nodes in the organization node 2 org 2 in the blockchain according to the above strategy. Therefore, the first multiple execution nodes are m1+m2 execution nodes. The m1+m2 execution nodes may be regarded as a list of initial execution nodes to execute the information processing task.

In the result reception step S204, it is possible to receive results of executing the information processing task which are returned from the first multiple execution nodes.

As an example, the first multiple execution nodes execute the information processing task respectively, and can return results of executing the information processing task to the user. The user can receive the results returned from the first multiple execution nodes.

In the first result selection step S206, it is possible to select at least a part from among the received results, as first results, based on a predetermined rule.

Preferably, selecting the first results from among the received results based on the predetermined rule comprises: selecting same read and write sets whose count is in a highest proportion in the total count of read and write sets, as the first results, from among the received results, the highest proportion being greater than a predetermined value.

As an example, the above predetermined value may be determined in advance by those skilled in the art according to experience. As an example but not a limitation, the predetermined value may be 50%.

As an example, when the results are received from the first multiple execution nodes, it is compared whether or not the results returned from all the first multiple execution nodes are consistent. As stated above, the execution results of the information processing task exist in the form of read and write sets. It is possible to use read and write sets which are mostly consistent as the first results. If read and write sets returned from different execution nodes are different, then same read and write sets which occupy a highest proportion in the returned read and write sets are used as the first results, and a proportion occupied by the same read and write sets in the total count of read and write sets is required to be for example greater than 50%.

If a proportion occupied by execution nodes returning same read and write sets in all the first multiple execution nodes is less than 50%, it is regarded that the task of generating the list of final execution nodes fails.

Preferably, read and write sets in the received results which are different from read and write sets in the first results are regarded as erroneous results, and execution nodes returning the erroneous results are judged as misbehavior nodes.

As an example, with respect to the misbehavior nodes, credit scores thereof will be reduced according to a predetermined discount rate.

$$\text{creditScore}'(\text{mispeer}) = \text{creditScore}(\text{mispeer}) * \text{creditDiscountRate} \quad (1)$$

In the expression (1), mispeer represents a misbehavior node, creditDiscountRate represents a discount rate determined in advance, creditScore(mispeer) represents an original credit score of the misbehavior node mispeer, and creditScore'(mispeer) represents a reduced credit score of the misbehavior node mispeer.

In the traditional blockchain, it is impossible to analyze misbehavior nodes at an endorsing phase. As can be seen from the above description, in the method 200 for generating a list of final execution nodes for an information processing task in a blockchain according to the embodiment of the present disclosure, through a comparison of consistency between results returned from different execution nodes, it is possible to judge misbehavior nodes and to reduce credit scores of the misbehavior nodes, thus making it possible to improve the security of executing the information processing task.

In the second result obtainment step S208, it is possible to obtain second results through security analysis with respect to the information processing task which is performed based on the first results, and to use a list of candidate execution nodes related to the second results as a list of final execution nodes for the information processing task in the blockchain.

As an example, in the second result obtainment step S208, second results are obtained by performing security analysis with respect to the information processing task based on the first results, and a list of execution nodes (i.e., list of candidate execution nodes) used for obtaining the second results is used as a list of final execution nodes, to recommend a new list of execution nodes to the user.

The method 200 for generating a list of final execution nodes for an information processing task in a blockchain according to the embodiment of the present disclosure ends at S209.

In the method 200 for generating a list of final execution nodes for an information processing task in a blockchain according to the embodiment of the present disclosure, second results are obtained by performing security analysis with respect to the information processing task based on the first results, and a list of candidate execution nodes related to the second results is used as a list of final execution nodes, to recommend a new list of execution nodes to the user to substitute the first multiple execution nodes, thus making it possible to improve the security of executing the information processing task.

Preferably, in the second result obtainment step S208, in a case where it is determined in the security analysis with respect to the information processing task that the information processing task is not a risk information processing task, the first results are used as second results, and the multiple first nodes are used as a list of final execution nodes.

Preferably, in the second result obtainment step S208, it is possible to dynamically change the predetermined strategy to a strategy having more strict requirements on credit degrees of the execution nodes, as the updated processing manner, in a case where it is determined that the information processing task is a risk information processing task; it is possible to submit the information processing task to second multiple execution nodes in the blockchain based on the changed strategy, wherein the second multiple subjects correspond to the second multiple execution nodes; and it is possible to receive results of executing the information processing task which are returned from the second multiple execution nodes, and to select at least a part from among the results received from the second multiple execution nodes, as second results, based on the predetermined rule.

As an example, in the second result obtainment step S208, a risk of the information processing task is analyzed. If it is determined that the information processing task is risky, i.e., it is determined that the information processing task is insecure, the predetermined strategy is dynamically changed to a strategy having more strict requirements on credit degrees of the execution nodes; then, it is possible to submit the information processing task to second multiple execution nodes in the blockchain based on the changed strategy. It should be noted herein that, the second multiple execution nodes are all nodes in the above list of candidate execution nodes related to the second results.

In the traditional blockchain, it is impossible to analyze a risky transaction. As can be seen from the above description, the method 200 for generating a list of final execution nodes for an information processing task in a blockchain according to the embodiment of the present disclosure can analyze a risk of the information processing task. If the information processing task is risky, the predetermined strategy is dynamically changed, to recommend second multiple execution nodes having higher credit degrees than the first multiple execution nodes to the user, thus implementing the security assurance of executing the information processing task.

Preferably, selecting at least a part from among the results received from the second multiple execution nodes, as second results, based on the predetermined rule comprises: selecting same read and write sets whose count is in a highest proportion in the total count of read and write sets, as the first results, from among the received results, the highest proportion being greater than a predetermined value.

As an example, the above predetermined value may be determined in advance by those skilled in the art according to experience. As an example but not a limitation, the predetermined value may be 50%.

As an example, when the results are received from the second multiple execution nodes, it is compared whether or not the results returned from all the second multiple execution nodes are consistent. As stated above, the execution results of the information processing task exist in the form of read and write sets. It is possible to use read and write sets which are mostly consistent as the second results. If read and write sets returned from different execution nodes in the second multiple execution nodes are different, same read and write sets which occupy a highest proportion in the returned read and write sets are used as the execution results by the second multiple execution nodes, and the proportion occupied by the same read and write sets in the total count of read and write sets is required to be for example greater than 50%.

If a proportion occupied by execution nodes returning same read and write sets in all the second multiple execution nodes is less than 50%, it is regarded that the task of generating the list of final execution nodes fails.

Preferably, it is possible to compute a risk score of the information processing task based on an operation risk score of the information processing task and a risk score of a node which submits the information processing task, to determine whether or not the information processing task is a risk information processing task.

A risk of the information processing task can be defined into m grades.

Correspondence between the risk score txRiskScore of the information processing task and the risk grade riskGrade is shown in Table 1 by taking defining the risk of the information processing task into four grades as an example below.

TABLE 1

| Risk Score of Information Processing Task | Risk Grade |
| --- | --- |
| 0~25 | 1 |
| 25~50 | 2 |

TABLE 1-continued

| Risk Score of Information Processing Task | Risk Grade |
|---|---|
| 50~75 | 3 |
| 75~100 | 4 |

As far as the blockchain is concerned, the information processing task means function invoking based on chaincode. If the information processing task invokes some important functions, for example initializes data, and clears all of the data, then the risk score of the information processing task will be relatively high, and correspondingly, the risk grade will also be relatively high.

If the information processing task contains a dangerous operation, for example the read/write sets contain null or is " ", then the information processing task is risky to some extent. Therefore, the operation risk score riskScore(operation) of the information processing task is defined as follows:

$$riskScore(\text{operation}) = \begin{cases} 100 & \frac{\text{a rate of empty key value pairs in the read write sets is greater than 50\%}}{} \\ 50 & \frac{\text{a rate of empty key value pairs in the read write sets is between 25\%~50\%}}{} \\ 0 & \frac{\text{a rate of empty key value pairs in the read write sets is less than 25\%}}{} \end{cases} \quad (2)$$

The credit score of the execution node is defined based on a history of the information processing task, with a default score being 100.

The credit score creditScore(orgi) of the organization node orgi is defined as an average value of the credit scores of all the nodes included in the organization node:

$$creditScore(orgi) = \frac{1}{n}\sum_{i=1}^{n} creditScore(peer_i) \quad (3)$$

In the expression (3), $peer_i$ represents an i-th node in the organization node orgi, and n is the total count of the nodes in the organization node orgi.

Assuming that the user belongs to the organization node orgi, the credit score of the user is equivalent to the credit score of the organization node to which the user belongs:

$$creditScore(\text{user}) = creditScore(orgi) \quad (4)$$

The risk score of the node (user) which submits the information processing task is defined as follows:

$$riskScore(\text{clientCredit}) = 100 - creditScore(\text{user}) \quad (5)$$

As can be seen from the expression (5), if the credit score of the user is very high, the risk score riskScore(clientCredit) of the user will be very low.

It is possible to compute the risk score of the information processing task based on the operation risk score of the information processing task which is computed from the expression (2) and the risk score of the node which submits the information processing task which is computed from the expression (5).

If the risk score of the information processing task is greater than a threshold (for example, the threshold is 90 scores), the information processing task is determined to be a risk information processing task.

As can be seen from the above description, the method 200 for generating a list of final execution nodes for an information processing task in a blockchain according to the embodiment of the present disclosure can compute a risk score of the information processing task based on an operation risk score of the information processing task and a risk score of the node which submits the information processing task, thus making it possible to precisely determine whether or not the information processing task is a risk information processing task.

Preferably, it is also possible to compute a risk score of the information processing task based on an authority risk score of a role of execution node.

If the role of the execution node is an administrator, the information processing task is risky to some extent since the administrator has a relatively large authority. However, if the role of the execution node is a common member, the information processing task is secure since the common member does not have a relatively large authority. Therefore, the authority risk score riskScore(authorization) of the role of the execution node is defined as:

$$riskScore(\text{authorization}) = \begin{cases} 100 & \text{if the role of the execution nodes is administrator} \\ 0 & \text{if the role of the execution nodes is common member} \end{cases} \quad (6)$$

The risk score txRiskScore of the information processing task which is obtained based on the authority risk score of the role of the execution node, the operation risk score of the information processing task and the risk score of the node which submits the information processing task can be represented as follows:

$$\text{txRiskScore} = riskScore(\text{authorization})*\alpha + riskScore(\text{operation})*\beta + riskScore(\text{clientCredit})*(1-\alpha-\beta) \quad (7)$$

In the expression (7), $\alpha$ and $\beta$ may be parameters that can be determined in advance by those ordinarily skilled in the art according to experience.

As can be seen from the above description, the method 200 for generating a list of final execution nodes for an information processing task in a blockchain according to the embodiment of the present disclosure can also compute a risk score of the information processing task based on an authority risk score of a role of the execution node, thus making it possible to more precisely determine whether or not the information processing task is a risk information processing task.

Preferably, the changed strategy is generated by the following steps: it is possible to, based on a risk grade of the information processing task which corresponds to the risk score of the information processing task, compute the total count of candidate organization nodes and the total count of execution nodes which are needed to generate the list of candidate execution nodes, wherein each organization node comprises multiple nodes; it is possible to, based on a credit score of each candidate organization node and an overall credit score of the candidate organization nodes, compute a weight occupied by each candidate organization node when generating the list of candidate execution nodes; it is possible to, based on the weight of each candidate organization node and the total count of the execution nodes, compute the count of execution nodes in each candidate organization node which are needed to generate the list of candidate execution nodes; and it is possible to generate the changed strategy according to the count of the execution nodes in each candidate organization node which are needed to generate the list of candidate execution nodes.

As an example, it is possible to obtain a risk grade of the information processing task according to the correspondence between the risk score of the information processing task and the risk grade of the information processing task as shown in Table 1. Moreover, it is possible to, based on the obtained risk grade of the information processing task, compute the total count OrgCount of the candidate organization nodes and the total count PeerCount of the execution nodes which are needed to generate the list of candidate execution nodes respectively, as shown in the following expressions (8) and (9):

$$OrgCount = \frac{riskGrade}{riskGradeNum} * totalOrgCount \qquad (8)$$

In the expression (8), riskGrade is the risk grade of the information processing task, riskGradeNum is the total count (i.e., the above m grades as stated above) of the risk grades of the information processing task which are defined in advance, and totalOrgCount is the total count of organizations in the blockchain. As an example, it is possible to select OrgCount number organization nodes in a descending order of the credit scores of the organization nodes from among all the organization nodes, as the candidate organization nodes.

$$PeerCount = \frac{riskGrade}{riskGradeNum} * totalPeerCount \qquad (9)$$

In the expression (9), totalPeerCount is the total count of the execution nodes in the blockchain.

As can be seen from the expressions (8) and (9), both the total count OrgCount of the candidate organization nodes and the total count PeerCount of the execution nodes which are needed to generate the list of candidate execution nodes are more as the risk grade of the information processing task is higher.

It is then possible to, based on a credit score of each candidate organization node and an overall credit score of the candidate organization nodes, compute a weight weight (orgi) occupied by each candidate organization node when generating the list of candidate execution nodes, as shown in the following expression (10):

$$weight(orgi) = \frac{creditScore(orgi)}{\sum_{i=1}^{OrgCount} creditScore(orgi)} \qquad (10)$$

In the expression (10), orgi represents i (i=1, 2, . . . , OrgCount)-th candidate organization node, and OrgCount is the total count of the candidate organization nodes needed to generate the list of candidate execution nodes which is computed from the expression (8).

As can be seen from the expression (10), the higher a credit score of a candidate organization node is, the larger a weight occupied by the candidate organization node when generating the list of candidate execution nodes is.

Subsequently, it is possible to, based on the weight weight(orgi) of each candidate organization node and the total count PeerCount of the execution nodes, compute the count PeerCount(orgi) of execution nodes in each candidate organization node which are needed to generate the list of candidate execution nodes, as shown in the following expression (11).

$$PeerCount(orgi)=weight(orgi)*PeerCount \qquad (11)$$

In the expression (11), PeerCount is the total count of the execution nodes needed to generate the list of candidate execution nodes which is computed from the expression (9). As an example, it is possible to select PeerCount(orgi) number execution nodes in a descending order of the credit scores of the execution nodes from among all the execution nodes in each candidate organization node.

As can be seen from the combination of the expressions (10) and (11), the higher a credit score of a candidate organization node is, the larger the count of execution nodes in the candidate organization node which are needed to generate the list of candidate execution nodes is.

Finally, it is possible to generate the changed strategy according to the count of the execution nodes in each candidate organization node which are needed to generate the list of candidate execution nodes.

As an example, assuming that the total count OrgCount of the candidate organization nodes needed to generate the list of candidate execution nodes which is computed from the expression (8) is 2, the changed strategy may be defined as follows:

$$AND(PeerCount(org1') \text{ of } org1', PeerCount(org2') \text{ of } org2') \qquad (12)$$

In the expression (12), PeerCount(org1') represents the count of execution nodes in a candidate organization node org1' which are needed to generate the list of candidate execution nodes, PeerCount(org2') represents the count of execution nodes in a candidate organization node org2' which are needed to generate the list of candidate execution nodes, and both PeerCount(org1') and PeerCount(org2') are obtained through calculation from the expression (11).

The changed strategy as shown in the expression (12) means: to acquire PeerCount(org1') number execution results of the information processing task from the candidate organization node 1 org 1' and to acquire PeerCount(org2') number execution results of the information processing task from the candidate organization node 2 org 2'.

As can be seen from the above description, the method 200 for generating a list of final execution nodes for an information processing task in a blockchain according to the embodiment of the present disclosure can generate, based on a risk grade of the information processing task, a changed strategy having more strict requirements on credit degrees of the execution nodes.

It should be noted that, the following has been described when describing the second result obtainment step S208 in the present disclosure: it is possible to submit the information processing task to second multiple execution nodes in the blockchain based on the changed strategy; taking the changed strategy as shown in the expression (12) as an example, the second multiple execution nodes are composed of PeerCount(org1') number execution nodes in the candidate organization node org 1' and PeerCount(org2') number execution nodes in the candidate organization node 2 org 2'.

Preferably, the list of candidate execution nodes can be sorted according to a descending order of the credit scores of the candidate organization nodes.

Taking the changed strategy as shown in the expression (12) as an example, the list of candidate execution nodes based on the changed strategy may be represented as follows:

$$\{peer_1(org1'), peer_2(org1'), \ldots, peer_{PeerCount(org1')}(org1'),$$

$$peer_1(org2'), peer_2(org2'), \ldots, peer_{PeerCount(org2')}(org2')\} \quad (13)$$

In the expression (13), $Peer_i(org1')$ ($i=1, 2, \ldots,$ PeerCount(org1')) represents an i-th candidate execution node in the candidate organization node org 1', and $Peer_j(org2')$ ($j=1, 2, \ldots,$ PeerCount(org2')) represents a j-th candidate execution node in the node org 2'. As an example but not a limitation, the list of candidate execution nodes based on the changed strategy may be overlapped with the above list of initial execution nodes.

As can be seen from the above description, in the method 200 for generating a list of final execution nodes for an information processing task in a blockchain according to the embodiment of the present disclosure, the higher a credit score of a candidate organization node is, the larger the count of execution nodes in the candidate organization node which are needed to generate the list of candidate execution nodes is, and accordingly, the higher a credit degree of the generated list of candidate execution nodes is.

It should be noted that in the second result obtainment step S208, if it is determined, after the information processing task is submitted to second multiple execution nodes in the blockchain based on the changed strategy, that the information processing task is insecure, it is regarded that the task of generating the list of final execution nodes fails.

To more clearly describe the method 200 for generating a list of final execution nodes for an information processing task in a blockchain according to the embodiment of the present disclosure, an exemplary flow of the method 200 for generating a list of final execution nodes for an information processing task in a blockchain according to the embodiment of the present disclosure will be described in combination with FIG. 3 below.

Figure 3:
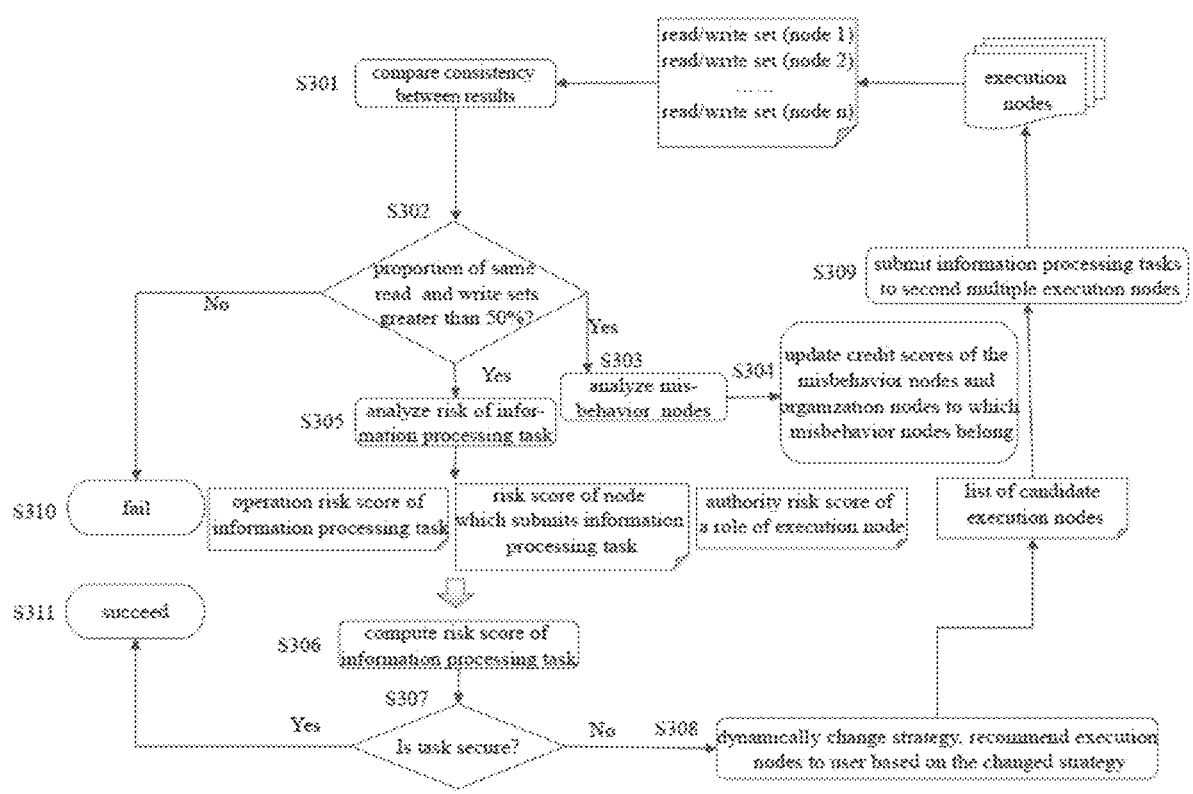
FIG. 3 shows an exemplary flow of the method for generating a list of final execution nodes for an information processing task in a blockchain according to the embodiment of the present disclosure.

To simplify description, a step of submitting the information processing task to first multiple execution nodes in the blockchain based on a predetermined strategy is omitted in FIG. 3. In FIG. 3, the exemplary flow of the method 200 for generating a list of final execution nodes for an information processing task in a blockchain according to the embodiment of the present disclosure starts at step S301. In step S301, results of executing the information processing task which are returned from the first multiple execution nodes are received (wherein, the results are in the form of read and write sets, and for example as shown in FIG. 3, the results include the following read and write sets returned from node 1, node 2, . . . , node n: read/write set (node 1), read/write set (node 2), . . . , read/write set (node n)), and a comparison as to consistency between the results is performed. In step S302, it is judged whether or not the returned results include same read and write sets whose count is in a highest proportion in the total count of read and write sets, the highest proportion being greater than a predetermined value (for example, the predetermined value is 50%). If a judgment result is NO, then proceed to step S310, and the task of generating the list of final execution nodes fails. If a judgment result is YES, then proceed to step S303 and step S305, respectively. In step S303, misbehavior nodes are analyzed according to the comparison of the results. With respect to the misbehavior nodes, in step S304, credit scores of the misbehavior nodes and of organization nodes to which the misbehavior nodes belong are updated. In step S305, a risk of the information processing task is analyzed. In step S306, it is possible to compute a risk score of the information processing task based on an operation risk score of the information processing task and a risk score of a node which submits the information processing task, and it is possible to compute a risk score of the information processing task based also on an authority risk score of a role of execution nodes. In step S307, it is judged, based on the computed risk score of the information processing task, whether or not the information processing task is secure. If a judgment result is YES, then proceed to step S311, in which without necessity of updating the predetermined strategy, the first multiple execution nodes are directly used as a list of final execution nodes, and the task of generating the list of final execution nodes succeeds. If a judgment result is NO, then proceed to step S308, in which the predetermined strategy is dynamically changed to a strategy having more strict requirements on credit degrees of the execution nodes, and execution nodes are recommended to the user based on the changed strategy, so as to generate a list of candidate execution nodes composed of second multiple execution nodes, and the list of candidate execution nodes is used as a list of final execution nodes. In step S309, the information processing task is submitted to the second multiple execution nodes, and thereafter, it is possible to select the second results mentioned above, from among the results of executing the information processing task which are returned by the second multiple execution nodes, through processing similar to those in step S301 through step S304.

Figure 4:
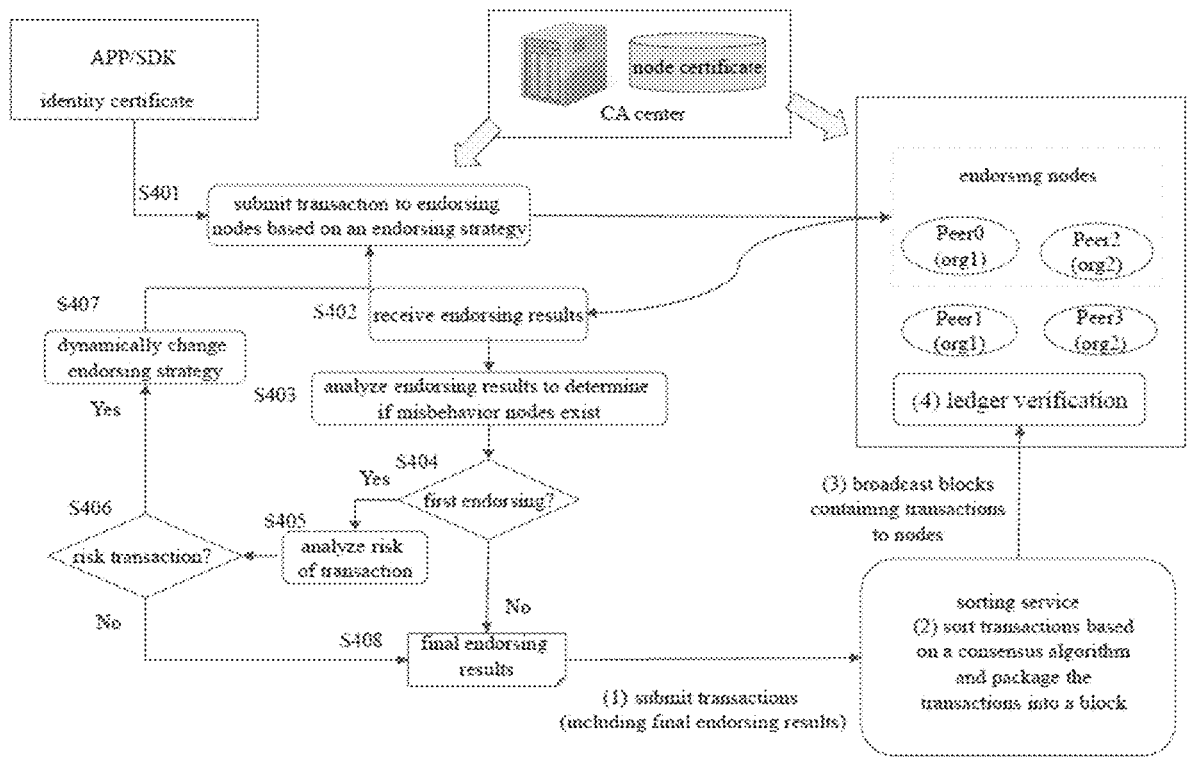
FIG. 4 is a system structure diagram showing an application of the method for generating a list of final execution nodes for an information processing task in a blockchain according to the embodiment of the present disclosure to a consortium chain.

Consortium blocks can solve the decentralization consensus problem between enterprises and between entities. Hereinafter, the method 200 for generating a list of final execution nodes for an information processing task in a blockchain according to the embodiment of the present disclosure will be described in combination with a consortium chain. FIG. 4 is a system structure diagram showing an application of the method 200 for generating a list of final execution nodes for an information processing task in a blockchain according to the embodiment of the present disclosure to the consortium chain.

Information of blockchain transactions which is saved in the consortium chain may be called a ledger for short, and a process of executing a chaincode may be called endorsing. To facilitate description below, in combination with the consortium chain, the information processing task to which the method 200 for generating a list of final execution nodes for an information processing task in a blockchain according to the embodiment of the present disclosure relates is called a transaction; the process of executing the information processing task (transaction) by multiple execution nodes is a process of executing a chaincode by the multiple execution nodes, and this process may be called endorsing; the execution nodes may be called endorsing nodes; the execution results returned by the execution nodes after executing the transaction may be called endorsing results; the list of final execution nodes may be called a list of candidate endorsing nodes; and the predetermined strategy may be called a predetermined endorsing strategy.

In FIG. 4, APP/SDK represents a client where a user to initiate a transaction lies, the user uses an identity certificate to prove the user's identify so as to access the consortium chain, and CA center is used to verify the validity of a digital certificate (identity certificate).

An exemplary flow of the method 200 for generating a list of final execution nodes (list of final endorsing nodes) for an information processing task in a blockchain according to the embodiment of the present disclosure will be described using steps S401 through S408 below.

In step S401 in FIG. 4, the user submits a transaction to first multiple endorsing nodes based on a predetermined endorsing strategy. In the endorsing node module in FIG. 4, four endorsing nodes are schematically shown: endorsing node Peer0 and Peer1 belonging to the organization 1 Org1, and endorsing node Peer2 and Peer3 belonging to the organization 2 Org2. Assuming that that the first multiple endorsing nodes include Peer0 and Peer2, the two endorsing nodes execute the transaction (i.e., execute the chaincode) and generate endorsing results respectively after receiving the transaction.

In step S402, the user receives endorsing results returned from the first multiple endorsing nodes.

In step S403, the received endorsing results are analyzed to judge whether or not misbehavior nodes exist.

In step S404, it is judged whether or not the endorsing is first endorsing. If a judgment result in step S404 is YES, then proceed to step S405.

In step S405, a risk of the transaction is analyzed.

In step S406, it is judged whether or not the transaction is a risk transaction. If a judgment result in step S406 is NO, at least a part is selected from among the endorsing results received by the first multiple endorsing nodes, as final endorsing results (for example, same read and write sets which occupy a highest proportion in the received read and write sets are selected as final endorsing results, and a proportion occupied by the same read and write sets in the total count of read and write sets is required to be for example greater than 50%), and the first multiple endorsing nodes are used as a list of final endorsing nodes.

If a judgment result in step S406 is YES, then proceed to step S407.

In step S407, the endorsing strategy is dynamically changed to a strategy having more strict requirements on credit degrees of the endorsing nodes, and the transaction is submitted to second multiple endorsing nodes based on the changed strategy. Thereafter, processing similar to those in steps S402 and S403 are performed, that is, the user receives endorsing results returned from the second multiple endorsing nodes, and performs security analysis with respect to the received endorsing results to judge whether or not misbehavior nodes exist.

If a judgment result in step S404 is NO, then proceed to step S408. In step S408, since the endorsing is second endorsing, but not first endorsing, it is demonstrated that processing related to transaction risk analysis has been performed in the first endorsing; thus, at least a part is selected from among the endorsing results received from the second multiple endorsing results, as final endorsing results (for example, same read and write sets which occupy a highest proportion in the received read and write sets are selected as final endorsing results, and a proportion occupied by the same read and write sets in the total count of read and write sets is required to be for example greater than 50%), and the second multiple endorsing nodes are used as a list of final endorsing nodes.

The flow of performing endorsing so as to generate a list of final endorsing nodes by the method 200 according to the embodiment of the present disclosure has been described above using steps S401 through S408.

After the endorsing ends, in the consortium chain, as shown by (1) in FIG. 4, the user submits transactions (including final endorsing results) to a sorting service. Then as shown by (2) in FIG. 4, the sorting service sorts the transactions based on a consensus algorithm, then packages several transactions into a block, and then adds the block into the chain. Thereafter, as shown by (3) in FIG. 4, all the blocks containing transactions are broadcasted to all the nodes. Finally, as shown by (4) in FIG. 4, ledger verification is performed, that is, when every node receives the blocks of transactions, the node will verify the validity of all the transactions in the block, and if the transactions are valid, the transactions will save key value states of the transactions in a database.

As an example, the method 200 for generating a list of final execution nodes for an information processing task in a blockchain according to the embodiment of the present disclosure can be applied to a medical blockchain. Blockchain participant subjects include a hospital, an insurance company and an individual. That is, computers located at a hospital, an insurance company and an individual can be execution nodes in the blockchain. There may be multiple hospitals, each of which maintains diagnostic data of patients in that hospital. An individual maintains his/her own diagnostic data in all the hospitals. Hash values of the diagnostic data in the hospital and the diagnostic data of the individual (the amount of data can be reduced by saving hash values) are both saved on the blockchain. History case records saved by the hospital and the individual are not tamperable and are decentralized. If it is desired to share data between hospitals, a transaction must be initiated to get an agreement from the other party. If a hospital desires to acquire data of an individual, it shall also initiate a transaction to get an agreement from the other party. All data use histories will be recorded on the blockchain. An insurance company can initiate a transaction to acquire history case records from a hospital or an individual, and then customize a medical insurance preferential plan. For example, computers located at the hospital, the insurance company and the individual may include the APP/SDK in FIG. 4 (i.e., the client where the user to initiate a transaction lies), and the user to initiate a transaction which is mentioned in the related description of FIG. 4 may be a hospital, an insurance company and an individual.

In addition, the method 200 for generating a list of final execution nodes for an information processing task in a blockchain according to the embodiment of the present disclosure can also be applied to a supply chain, e.g., a food traceability system describing import beef. Blockchain participant subjects include a cow-raising pasture, a beef production enterprise, a transport enterprise, a sales enterprise, etc. Each enterprise maintains its own nodes, to save all the states of beef. Each step of beef production will be saved on the blockchain. Data on the blockchain is decentralized and tramper-proof. In case of a food safety issue occurring to the beef, it is possible to find out, through a blockchain traceability source, to which enterprise the issue occurs.

Figure 5:
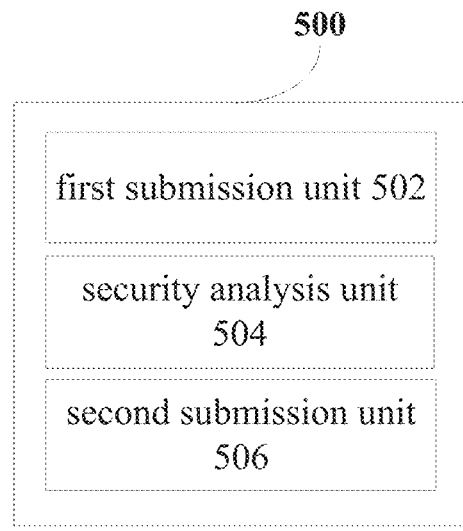
FIG. 5 is a block diagram showing a function configuration example of an apparatus for processing information by cooperation of multiple subjects according to an embodiment of the present disclosure.

Corresponding to the above method embodiment for processing information by cooperation of multiple subjects, the present disclosure further provides the following embodiment of an apparatus 500 for processing information by cooperation of multiple subjects FIG. 5 is a block diagram showing a function configuration example of the apparatus 500 for processing information by cooperation of multiple subjects according to the embodiment of the present disclosure.

As shown in FIG. 5, the apparatus 500 for processing information by cooperation of multiple subjects according to the embodiment of the present disclosure comprises a first submission unit 502, a security analysis unit 504 and a second submission unit 506. Next, function configuration examples of the first submission unit 502, the security analysis unit 504 and the second submission unit 506 will be described.

In the first submission unit 502, it is possible to submit the information processing task to first multiple subjects.

As an example, the first multiple subjects may be multiple subjects which are trustless in each other.

In the security analysis unit 504, it is possible to perform security analysis with respect to information processing results obtained by executing the specific information processing task by the first multiple subjects, and to determine an updated processing manner of executing the specific information processing task based on a result of the security analysis.

As an example, in the security analysis unit 504, if the security analysis represents existence of a security risk, an updated processing manner of executing the specific information processing task is determined.

In the second submission unit 506, the specific information processing task is submitted to second multiple subjects according to the determined updated processing manner, and information processing results of executing the specific information processing task by the second multiple subjects are obtained, wherein each of the second multiple subjects and each of the first multiple subjects save same information associated with the specific information processing task, and the information is updated based on the information processing results of executing the specific information processing task by the second multiple subjects.

As an example, in the second submission unit 506, the specific information processing task is submitted to second multiple subjects, but not to the first multiple subjects, according to the determined updated processing manner.

In the apparatus 500 for processing information by cooperation of multiple subjects according to the embodiment of the present disclosure, it is possible to improve the security of executing an information processing task by performing security analysis with respect to information processing results obtained by executing the specific information processing task by the first multiple subjects, and determining an updated processing manner of executing the specific information processing task based on a result of the security analysis.

Figure 6:
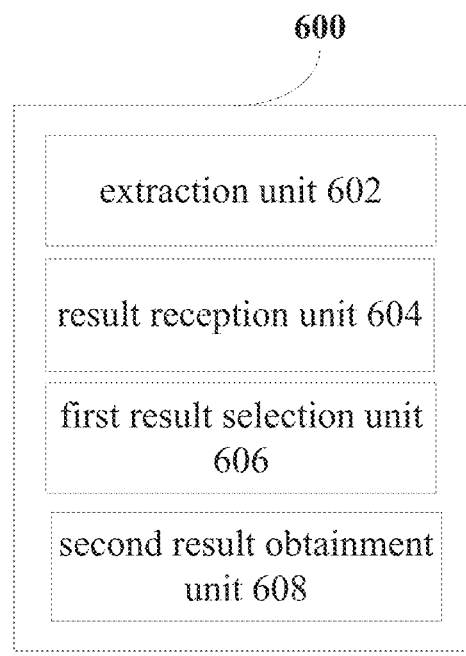
FIG. 6 is a block diagram showing a function configuration example of an apparatus for generating a list of final execution nodes for an information processing task in a blockchain according to an embodiment of the present disclosure.

Preferably, the specific information processing task is an information processing task associated with a blockchian, and the first multiple subjects and the second multiple subjects are execution nodes to which the blockchain relates. The apparatus 500 for processing information by cooperation of multiple subjects according to the embodiment of the present disclosure can be embodied as an apparatus 600 for generating a list of final execution nodes for an information processing task in a blockchain. FIG. 6 is a block diagram showing a function configuration example of the apparatus 600 for generating a list of final execution nodes for an information processing task in a blockchain according to an embodiment of the present disclosure. As shown in FIG. 6, the apparatus 600 for generating a list of final execution nodes for an information processing task in a blockchain according to the embodiment of the present disclosure comprises an information processing task submission unit 602, a result reception unit 604, a first result selection unit 606 and a second result obtainment unit 608. The first submission unit 502 in the apparatus 500 for processing information by cooperation of multiple subjects according to the embodiment of the present disclosure can be configured to execute the processing executed in the information processing task submission unit 602. The security analysis unit 504 and the second submission unit 506 in the apparatus 500 for processing information by cooperation of multiple subjects according to the embodiment of the present disclosure can be configured to execute the processing executed in the result reception unit 604, the first result selection unit 606 and the second result obtainment unit 608.

Next, function configuration examples of the information processing task submission unit 602, the result reception unit 604, the first result selection unit 606 and the second result obtainment unit 608 will be described.

In the information processing task submission unit 602, it is possible to submit the information processing task to first multiple execution nodes in the blockchain based on a predetermined strategy, wherein the first multiple subjects correspond to the first multiple execution nodes As an example but not a limitation, one or more organization nodes exist in the blockchain, each organization node comprising multiple nodes, the multiple nodes comprising multiple execution nodes. When a user desires to perform an information processing task (for example, to perform a transaction) in the blockchain, the user can submit the information processing task to first multiple execution nodes in the blockchain based on a predetermined strategy. Hereinafter, the user may be called a node which submits the information processing task, The predetermined strategy may be a strategy determined in advance. For example, the predetermined strategy may be a strategy determined in advance according to an execution history of same or similar information processing tasks.

For specific examples of the predetermined strategy, reference may be made to the description in the corresponding portions in the above method embodiment in regard to for example the information processing task submission step S202, and no repeated description will be made herein.

In the result reception unit 604, it is possible to receive results of executing the information processing task which are returned from the first multiple execution nodes.

As an example, the first multiple execution nodes execute the information processing task respectively, and can return results of executing the information processing task to the user. The user can receive the results returned from the first multiple execution nodes.

In the first result selection unit 606, it is possible to select at least a part from among the received results, as first results, based on a predetermined rule.

Preferably, in the first result selection unit 606, the first results are selected through the processing of: selecting same read and write sets whose count is in a highest proportion in the total count of read and write sets, as the first results, from among the received results, the highest proportion being greater than a predetermined value As an example, the above predetermined value may be determined in advance by those skilled in the art according to experience. As an example but not a limitation, the predetermined value may be 50%.

As an example, when the results are received from the first multiple execution nodes, it is compared whether or not the results returned from all the first multiple execution nodes are consistent. As stated above, the execution results of the information processing task exist in the form of read and write sets. It is possible to use read and write sets which are mostly consistent as the first results. If read and write sets returned from different execution nodes are different, then same read and write sets which occupy a highest proportion in the returned read and write sets are used as the first results, and a proportion occupied by the same read and write sets in the total count of read and write sets is required to be for example greater than 50%.

If a proportion occupied by execution nodes returning same read and write sets in all the first multiple execution nodes is less than 50%, it is regarded that the task of generating the list of final execution nodes fails.

Preferably, the first result selection unit 606 is further configured to regard, as erroneous results, read and write sets in the received results which are different from read and write sets in the first results, and to judge, as misbehavior nodes, execution nodes returning the erroneous results.

As an example, with respect to the misbehavior nodes, credit scores thereof will be reduced according to a predetermined discount rate.

As can be seen from the above description, in the apparatus 600 for generating a list of final execution nodes for an information processing task in a blockchain according to the embodiment of the present disclosure, through a comparison of consistency between results returned from different execution nodes, it is possible to judge misbehavior nodes and to reduce credit scores of the misbehavior nodes, thus making it possible to improve the security of executing the information processing task.

In the second result obtainment unit 608, it is possible to obtain second results through security analysis with respect to the information processing task which is performed based on the first results, and to use a list of candidate execution nodes related to the second results as a list of final execution nodes for the information processing task in the blockchain.

As an example, in the second result obtainment unit 608, second results are obtained by performing security analysis with respect to the information processing task based on the first results, and a list of execution nodes (i.e., list of candidate execution nodes) used for obtaining the second results is used as a list of final execution nodes, to recommend a new list of execution nodes to the user.

In the apparatus 600 for generating a list of final execution nodes for an information processing task in a blockchain according to the embodiment of the present disclosure, second results are obtained by performing security analysis with respect to the information processing task based on the first results, and a list of candidate execution nodes related to the second results is used as a list of final execution nodes, to recommend a new list of execution nodes to the user to substitute the first multiple execution nodes, thus making it possible to improve the security of executing the information processing task.

Preferably, in the second result obtainment unit 608, in a case where it is determined in the security analysis with respect to the information processing task that the information processing task is not a risk information processing task, the first results are used as second results, and the multiple first nodes are used as a list of final execution nodes.

Preferably, in the second result obtainment unit 608, it is possible to dynamically change the predetermined strategy to a strategy having more strict requirements on credit degrees of the execution nodes, as the updated processing manner, in a case where it is determined that the information processing task is a risk information processing task; it is possible to submit the information processing task to second multiple execution nodes in the blockchain based on the changed strategy, wherein the second multiple subjects correspond to the second multiple execution nodes; and it is possible to receive results of executing the information processing task which are returned from the second multiple execution nodes, and to select at least a part from among the results received from the second multiple execution nodes, as second results, based on the predetermined rule As an example, in the second result obtainment unit 608, a risk of the information processing task is analyzed. If it is determined that the information processing task is risky, i.e., it is determined that the information processing task is insecure, the predetermined strategy is dynamically changed to a strategy having more strict requirements on credit degrees of the execution nodes; then, it is possible to submit the information processing task to second multiple execution nodes in the blockchain based on the changed strategy. It should be noted herein that, the second multiple execution nodes are all nodes in the above list of candidate execution nodes related to the second results.

As can be seen from the above description, the apparatus 600 for generating a list of final execution nodes for an information processing task in a blockchain according to the embodiment of the present disclosure can analyze a risk of the information processing task. If the information processing task is risky, the predetermined strategy is dynamically changed, to recommend second multiple execution nodes having higher credit degrees than the first multiple execution nodes to the user, thus implementing the security assurance of executing the information processing task.

Preferably, selecting at least a part from among the results received from the second multiple execution nodes, as second results, based on the predetermined rule comprises: selecting same read and write sets whose count is in a highest proportion in the total count of read and write sets, as the first results, from among the received results, the highest proportion being greater than a predetermined value.

As an example, the above predetermined value may be determined in advance by those skilled in the art according to experience. As an example but not a limitation, the predetermined value may be 50%.

As an example, when the results are received from the second multiple execution nodes, it is compared whether or not the results returned from all the second multiple execution nodes are consistent. As stated above, the execution results of the information processing task exist in the form of read and write sets. It is possible to use read and write sets which are mostly consistent as the second results. If read and write sets returned from different execution nodes in the second multiple execution nodes are different, same read and write sets which occupy a highest proportion in the returned read and write sets are used as the execution results by the second multiple execution nodes, and the proportion occupied by the same read and write sets in the total count of read and write sets is required to be for example greater than 50%.

If a proportion occupied by execution nodes returning same read and write sets in all the second multiple execution nodes is less than 50%, it is regarded that the task of generating the list of final execution nodes fails.

Preferably, it is possible to compute a risk score of the information processing task based on an operation risk score of the information processing task and a risk score of the node which submits the information processing task, to determine whether or not the information processing task is a risk information processing task.

For specific examples of the operation risk score of the information processing task, the risk score of the node which submits the information processing task and the risk score of the information processing task, reference may be made to the description in the corresponding portions in the above method embodiment in regard to for example the second result obtainment step S208, and no repeated description will be made herein.

If the risk score of the information processing task is greater than a threshold (for example, the threshold is 90 scores), the information processing task is determined to be a risk information processing task.

As can be seen from the above description, the apparatus 600 for generating a list of final execution nodes for an information processing task in a blockchain according to the embodiment of the present disclosure can compute a risk score of the information processing task based on an operation risk score of the information processing task and a risk score of the node which submits the information processing task, thus making it possible to precisely determine whether or not the information processing task is a risk information processing task.

Preferably, it is also possible to compute a risk score of the information processing task based on an authority risk score of a role of the execution nodes.

For specific examples of the authority risk score, reference may be made to the description in the corresponding portions in the above method embodiment in regard to for example the second result obtainment step S208, and no repeated description will be made herein.

As can be seen from the above description, the apparatus 600 for generating a list of final execution nodes for an information processing task in a blockchain according to the embodiment of the present disclosure can also compute a risk score of the information processing task based on an authority risk score of a role of execution nodes, thus making it possible to more precisely determine whether or not the information processing task is a risk information processing task.

Preferably, the changed strategy is generated by the following processing: it is possible to, based on a risk grade of the information processing task which corresponds to the risk score of the information processing task, compute the total count of candidate organization nodes and the total count of execution nodes which are needed to generate the list of candidate execution nodes, wherein each organization node comprises multiple nodes; it is possible to, based on a credit score of each candidate organization node and an overall credit score of the candidate organization nodes, compute a weight occupied by each candidate organization node when generating the list of candidate execution nodes; it is possible to, based on the weight of each candidate organization node and the total count of the execution nodes, compute the count of execution nodes in each candidate organization node which are needed to generate the list of candidate execution nodes; and it is possible to generate the changed strategy according to the count of the execution nodes in each candidate organization node which are needed to generate the list of candidate execution nodes.

For specific examples of generating the changed strategy, reference may be made to the description in the corresponding portions in the above method embodiment in regard to for example the second result obtainment step S208, and no repeated description will be made herein.

As can be seen from the above description, the apparatus 600 for generating a list of final execution nodes for an information processing task in a blockchain according to the embodiment of the present disclosure can generate, based on a risk grade of the information processing task, a changed strategy having more strict requirements on credit degrees of the execution nodes.

It should be noted that, although the configuration of the apparatus for generating a list of final execution nodes for an information processing task in a blockchain according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Thus for contents not described in detail in the apparatus embodiment, reference may be made to the description in the corresponding portions in the method embodiment, and no repeated description will be made herein.

In addition, the present disclosure further provides a storage medium and a program product. Machine executable instructions in the storage medium and the program product according to embodiments of the present disclosure can be configured to implement the above method for generating a list of final execution nodes for an information processing task in a blockchain. Thus for contents not described in detail herein, reference may be made to the description in the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

In addition, according to another aspect of the present disclosure, there is provided a method 700 for verifying an information processing task in a blockchain. The method 700 for verifying an information processing task in a blockchain according to the embodiment of the present disclosure verifies the information processing task in the blockchain based on the second results obtained by the above method for processing information by cooperation of multiple subjects. In addition, it should be noted that hereinafter, to facilitate description, the method 700 is described by the second results obtained by the above method for processing information by cooperation of multiple subjects. However, those ordinarily skilled in the art can understand that the method 700 for verifying an information processing task in a blockchain according to the embodiment of the present disclosure can verify the information processing task based on endorsing results in universal blockchain technology.

Figure 7:
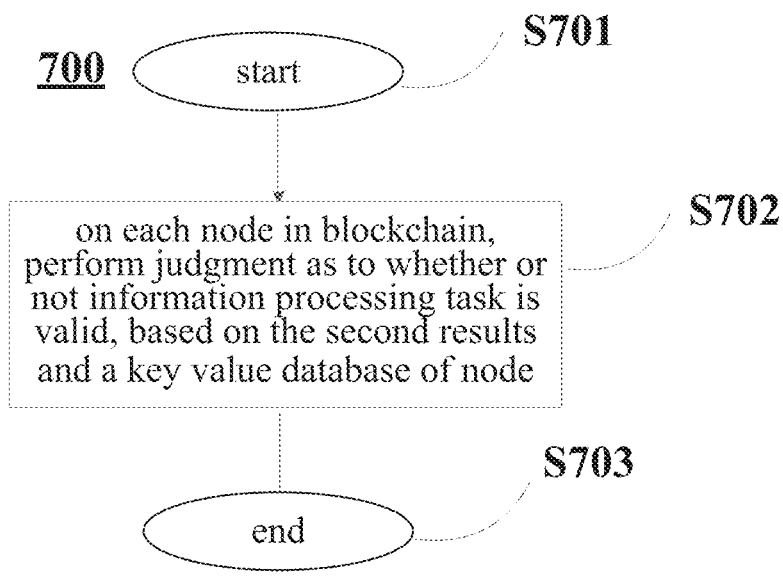
FIG. 7 is a flowchart showing a flow example of a method for verifying an information processing task in a blockchain according to an embodiment of the present disclosure.

A flow example of the method 700 for verifying an information processing task in a blockchain according to the embodiment of the present disclosure will be described with reference to FIG. 7. FIG. 7 is a flowchart showing a flow example of the method 700 for verifying an information processing task in a blockchain according to the embodiment of the present disclosure.

The method 700 for verifying an information processing task in a blockchain according to the embodiment of the present disclosure starts at S701.

In a judgment step S702, it is possible to, on each node in the blockchain, perform a judgment as to whether or not the information processing task is valid, based on the second results and a key value database of the node.

As an example, as stated when describing the method 200 for processing information by cooperation of multiple subjects, the second results are selected from among the results of executing the information processing task by the candidate execution nodes.

A key value database of each node records state information of each information processing task.

In the method 700 for verifying an information processing task in a blockchain according to the embodiment of the present disclosure, when the information processing task is verified on each node in the blockchain, a judgment as to whether or not the information processing task is valid is performed based on the second results and a key value database of the node.

The method 700 for verifying an information processing task in a blockchain according to the embodiment of the present disclosure ends at S703.

As can be seen from the above description, in the method 700 for verifying an information processing task in a blockchain according to the embodiment of the present disclosure, a judgment as to whether or not the information processing task is valid is performed based on the second results and a key value database of the node, thus making it possible to increase an accuracy rate of verifying the information processing task.

Preferably, if a read set version in the second results is inconsistent with a read set version from the key value database of the node, a relationship between a read key and a write key of the information processing task is analyzed; in a case where the read key and the write key of the information processing task are associated, it is judged that the information processing task is invalid; and in a case where the read key and the write key of the information processing task are not associated, it is judged that the information processing task is valid.

In the consortium chain, as shown by (4) in FIG. 4, ledger verification is performed, that is, when every node receives the blocks of transactions, the node will verify the validity of all the transactions in the blocks, and if the transactions are valid, the transactions will save key value states of the transactions in a database. That is, a key value database of each node records state information of each transaction.

Figure 8:
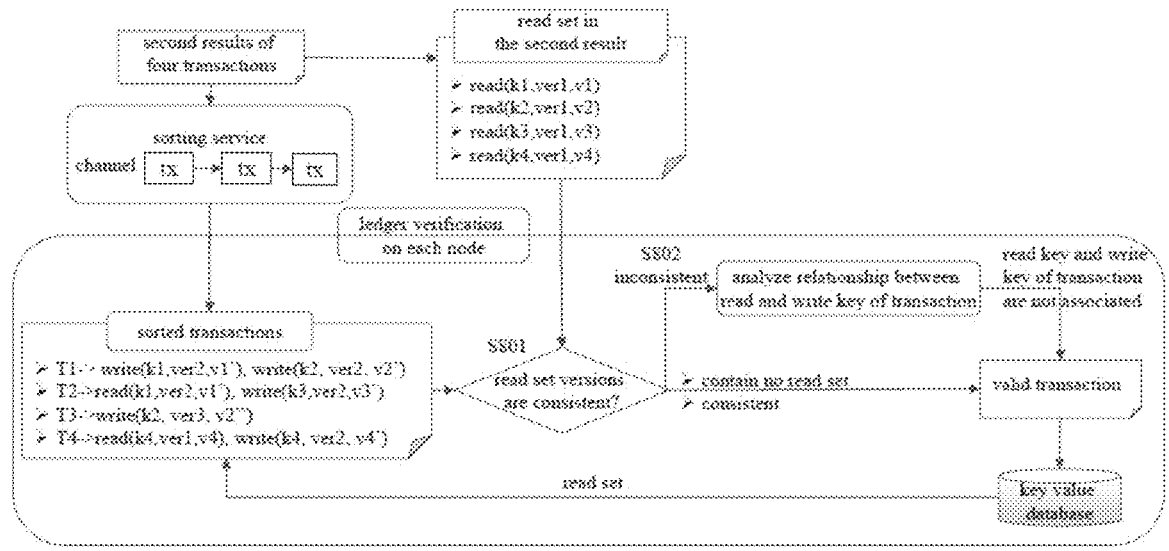
FIG. 8 shows an exemplary flow of the method for verifying an information processing task in a blockchain according to the embodiment of the present disclosure.

Hereinafter, the method 700 for verifying an information processing task in a blockchain according to the embodiment of the present disclosure will be described by taking verifying an information processing task (transaction) in the consortium chain as an example. In the consortium chain, the method 700 for verifying an information processing task in a blockchain according to the embodiment of the present disclosure performs ledger verification based on a version number of the read set in the second result (endorsing result) and a version number of the read set from the key value database of the node. FIG. 8 shows an exemplary flow of the method 700 for verifying an information processing task in a blockchain according to the embodiment of the present disclosure.

The read and write sets may include multiple combinations composed of keys, version numbers and key values, respectively. Hereinafter, to facilitate description, it is assumed that both the read and write sets include only one combination composed of keys, version numbers and key values. Therefore, the read and write sets are defined as read(key,version,value) and write(key,version,value), respectively, where key represents a key, version represents a version number, and value represents a key value.

As shown in FIG. 8, there are four transactions tx: T1, Tx, T3, T4. It is assumed that read sets included in the second results (endorsing results) are: read(k1,ver1,v1), read(k2, ver1,v2), read(k3,ver1,v3), read(k4,ver1,v4).

The function of the sorting service in FIG. 8 is the same as the function of the sorting service in FIG. 4, that is, the sorting service sorts the transactions based on a consensus algorithm, then packages several transactions into a block, and then adds the block into the chain.

At the ledger verification phase performed on each node as shown in FIG. 8, in step S801, it is judged whether or not a read set version in the second results and a read set version from the key value database of the node are consistent.

It is assumed that the following version numbers of the read set as shown in FIG. 8 are from the key value database (the key value database as shown in FIG. 8) in the node.

T1-→write(k1,ver2,v1'), write(k2,ver2,v2')
T2-→read(k1,ver2,v1'), write(k3,ver2,v3')
T3-→write(k2,ver3,v2")
T4-→read(k4, ver1,v4), write(k4,ver2,v4')

If it is judged in step S801 that the read set version in the second results and the read set version from the key value database of the node are consistent or that a transaction contains no read set, it is judged that the transaction is valid. For the valid transaction, every node will update an endorsing result to their own database.

If it is judged in step S801 that the read set version in the second results and the read set version from the key value database of the node are inconsistent, a relationship between a read key and a write key included in one transaction is analyzed in step S802. In a case where the read key and the write key of the transaction are associated, it is judged that the transaction is invalid, and in a case where the read key and the write key of the transaction are not associated, it is judged that the transaction is valid.

For example, it is assumed that a read set in the second result (endorsing result) of a transaction T2 is read(k1,ver1, v1). In FIG. 8, in the transaction T2, version number ver1 in the endorsing result read(k1,ver1,v1) is different from version number ver2 in read (k1,ver2,v1') in the key value database of the node, and thus it is necessary to analyze a relationship between the read key k1 and the write key k3 included in the transaction T2.

Provided that k3 has a dependency on k1, i.e., a value of k3 is computed based on a value of k1, for example v3'=v1+1, since the version number of the read key k1 is updated to ver2 and then the value of k1 is updated to v1', the computation v3'=v1+1 is erroneous because v1 has been updated to v1'. Therefore, the transaction T2 is invalid.

In the traditional blockchain, a relationship between a write key value and a read key value is not analyzed. Therefore, in a case where read key value versions in an endorsing result and a key value database of a node are inconsistent, failure of a transaction will be easily caused. However, as can be seen from the above description, the method 700 for verifying an information processing task in a blockchain according to the embodiment of the present disclosure analyzes a relationship between a read key and a write key of the information processing task in a case where a read set version in the second result is inconsistent with a read set version from the key value database of the node, thus making it possible to further increase the accuracy rate of verifying the information processing task.

Preferably, a relationship between a read key and a write key of the information processing task is analyzed based on static code analysis.

Figure 9:
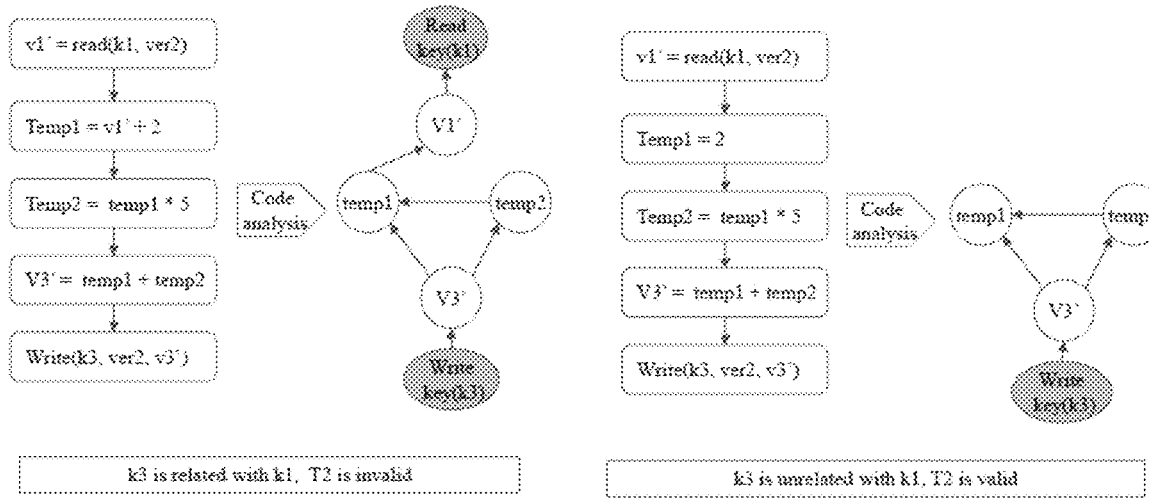
FIG. 9 is a diagram showing an example of performing analysis with respect to a relationship between a read key and a write key of an information processing task based on static code analysis according to an embodiment of the present disclosure.

In the blockchain, it is very difficult to analyze a relationship between a read key and a write key in an single transaction. The method 700 for verifying an information processing task in a blockchain according to the embodiment of the present disclosure solves this problem using static code analysis technology. FIG. 9 is a diagram showing an example of performing analysis with respect to a relationship between a read key and a write key of an information processing task based on static code analysis according to an embodiment of the present disclosure.

In method 700 for verifying an information processing task in a blockchain according to the embodiment of the present disclosure, as shown in FIG. 9, a syntax tree is generated for each transaction based on static code analysis. A topological structure between a read key (Read key) and a write key (Write key) is analyzed based on the generated syntax. With respect to write keys of each transaction, a relationship between each write key and each read key is analyzed. Taking the transaction T2 as shown in FIG. 8 as an example, a computation process of a write key value is tracked, for example, a computation process of the key value v3' of k3 is tracked.

If v3' is calculated in dependence on the read key value of k1, then k3 has a dependency on k1, and accordingly T2 is invalid.

If v3' is not calculated in dependence on the read key value of k1, then k3 has no dependency on k1, and accordingly T2 is valid.

Corresponding to the above method embodiment for verifying an information processing task in a blockchain, the present disclosure further provides the following embodiment of an apparatus 1000 for verifying an information processing task in a blockchain.

Figure 10:
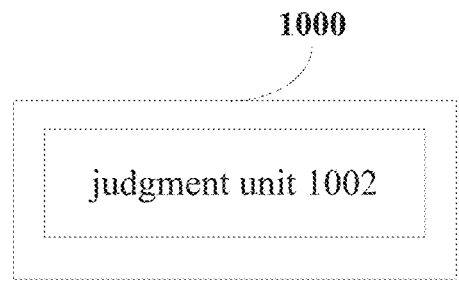
FIG. 10 is a block diagram showing a function configuration example of an apparatus for verifying an information processing task in a blockchain according to an embodiment of the present disclosure.

FIG. 10 is a block diagram showing a function configuration example of the apparatus 1000 for verifying an information processing task in a blockchain according to an embodiment of the present disclosure.

As shown in FIG. 10, the apparatus 1000 for verifying an information processing task in a blockchain according to the embodiment of the present disclosure comprises a judgment unit 1002. Next, a function configuration example of the judgment unit 1002 will be described.

In the judgment unit 1002, it is possible to, on each node in the blockchain, performing a judgment as to whether or not the information processing task is valid, based on the second results and a key value database of the node.

As an example, as stated when describing the method 200 for processing information by cooperation of multiple subjects, the second results are selected from among the results of executing the information processing task by the candidate execution nodes.

A key value database of each node records state information of each information processing task.

In the apparatus 1000 for verifying an information processing task in a blockchain according to the embodiment of the present disclosure, when the information processing task is verified on each node in the blockchain, a judgment as to whether or not the information processing task is valid is performed based on the second results and a key value database of the node.

As can be seen from the above description, in the apparatus 1000 for verifying an information processing task in a blockchain according to the embodiment of the present disclosure, a judgment as to whether or not the information processing task is valid is performed based on the second results and a key value database of the node, thus making it possible to increase an accuracy rate of verifying the information processing task.

Preferably, if a read set version in the second result is inconsistent with a read set version from the key value database of the node, a relationship between a read key and a write key of the information processing task is analyzed; in a case where the read key and the write key of the information processing task are associated, it is judged that the information processing task is invalid; and in a case where the read key and the write key of the information processing task are not associated, it is judged that the information processing task is valid.

For description of analyzing a relationship between a read key and a write key of the information processing task, reference may be made to the description in the corresponding portions in the above embodiment of the method 700 for verifying an information processing task in a blockchain in regard to for example FIG. 8, and no repeated description will be made herein.

As can be seen from the above description, the apparatus 1000 for verifying an information processing task in a blockchain according to the embodiment of the present disclosure analyzes a relationship between a read key and a write key of the information processing task in a case where a read set version in the second result is inconsistent with a read set version from the key value database of the node, thus making it possible to further increase the accuracy rate of verifying the information processing task.

Preferably, a relationship between a read key and a write key of the information processing task is analyzed based on static code analysis.

For description of the static code analysis, reference may be made to the description in the corresponding portions in the above embodiment of the method 700 for verifying an information processing task in a blockchain in regard to for example FIG. 9, and no repeated description will be made herein.

It should be noted that, although the configuration of the apparatus for verifying an information processing task in a blockchain according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Thus for contents not described in detail in the apparatus embodiment, reference may be made to the description in the corresponding portions in the method embodiment, and no repeated description will be made herein.

In addition, the present disclosure further provides a storage medium and a program product. Machine executable instructions in the storage medium and the program product according to embodiments of the present disclosure can be configured to implement the above method for verifying an information processing task in a blockchain. Thus for contents not described in detail herein, reference may be made to the description in the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

Figure 11:
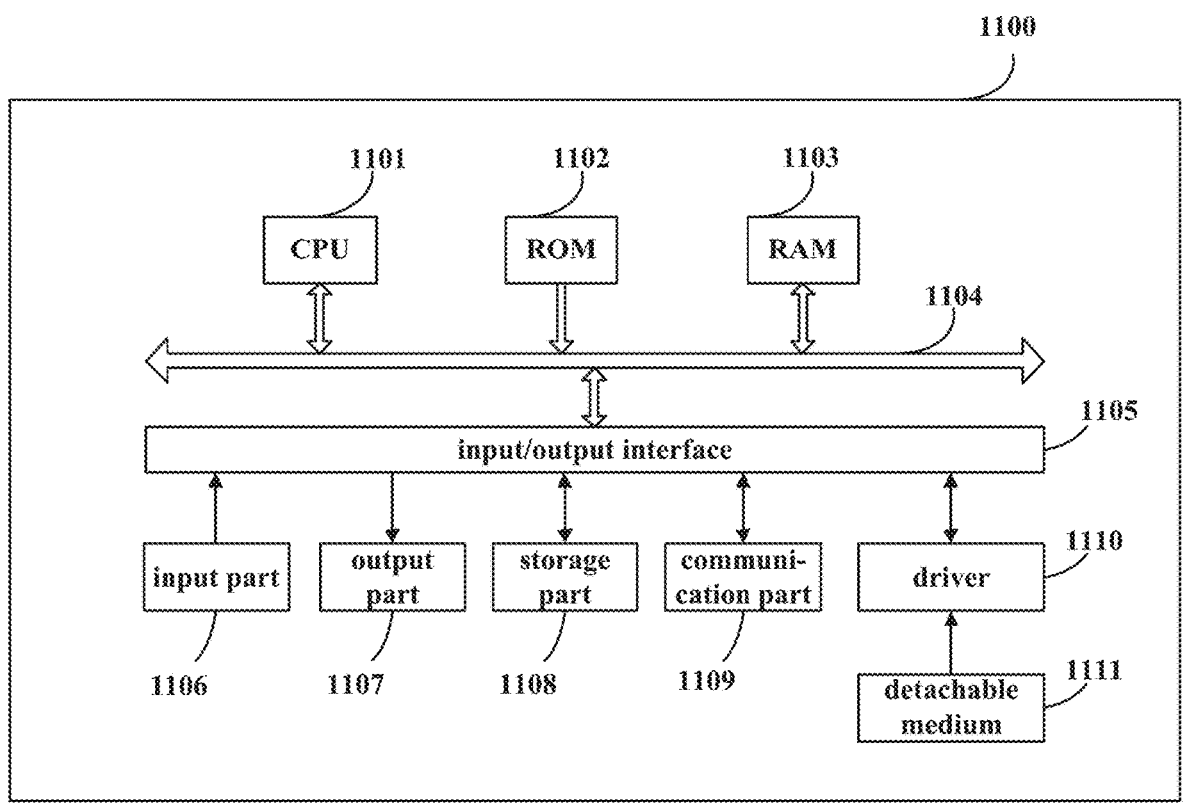
FIG. 11 is a block diagram showing an exemplary structure which is used as a personal computer usable in an embodiment of the present disclosure.

In addition, it should also be noted that, the foregoing series of processing and apparatuses can also be implemented by software and/or firmware. In the case of implementation by software and/or firmware, programs constituting the software are installed from a storage medium or a network to a computer having a dedicated hardware structure, for example the universal personal computer 1100 as shown in FIG. 11. The computer, when installed with various programs, can execute various functions and the like.

In FIG. 11, a Central Processing Unit (CPU) 1101 executes various processing according to programs stored in a Read-Only Memory (ROM) 1102 or programs loaded from a storage part 1108 to a Random Access Memory (RAM) 1103. In the RAM 1103, data needed when the CPU 1101 executes various processing and the like is also stored, as needed.

The CPU 1101, the ROM 1102 and the RAM 1103 are connected to each other via a bus 1104. An input/output interface 1105 is also connected to the bus 1104.

The following components are connected to the input/output interface 1105: an input part 1106, including a keyboard, a mouse and the like; an output part 1107, including a display, such as a Cathode Ray Tube (CRT), a Liquid Crystal Display (LCD) and the like, as well as a speaker and the like; the storage part 1108, including a hard disc and the like; and a communication part 1109, including a network interface card such as an LAN card, a modem and the like. The communication part 1109 executes communication processing via a network such as the Internet.

As needed, a driver 1110 is also connected to the input/output interface 1105. A detachable medium 1111 such as a magnetic disc, an optical disc, a magnetic optical disc, a semiconductor memory and the like is installed on the driver 1110 as needed, such that computer programs read therefrom are installed in the storage part 1108 as needed.

In a case where the foregoing series of processing is implemented by software, programs constituting the software are installed from a network such as the Internet or a storage medium such as the detachable medium 1111.

Those skilled in the art should appreciate that, such a storage medium is not limited to the detachable medium 1111 in which programs are stored and which are distributed separately from an apparatus to provide the programs to users as shown in FIG. 11. Examples of the detachable medium 1111 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 1102 and the memory part 1108, in which programs are stored and which are distributed together with the apparatus containing them to users.

Preferred embodiments of the present disclosure have been described above with reference to the drawings. However, the present disclosure of course is not limited to the above examples. Those skilled in the art can obtain various alterations and modifications within the scope of the appended claims, and it should be understood that these alterations and modifications naturally will fall within the technical scope of the present disclosure.

For example, in the above embodiments, a plurality of functions incorporated in one unit can be implemented by separate devices. Alternatively, in the above embodiments, a plurality of functions implemented by a plurality of units can be implemented by separate devices, respectively. In addition, one of the above functions can be implemented by a plurality of units. Undoubtedly, such configuration is included within the technical scope of the present disclosure.

In the specification, the steps described in the flowcharts not only include processing executed in the order according to a time sequence, but also include processing executed in parallel or separately but not necessarily according to a time sequence. Moreover, even in the steps of the processing according to a time sequence, it is of course still possible to appropriately change the order.

In addition, the following configurations can also be performed according to the technology of the present disclosure.

APPENDIX 1

A method for processing information by cooperation of multiple subjects, comprising:
  a first submission step of submitting a specific information processing task to first multiple subjects;
  a security analysis step of performing security analysis with respect to information processing results obtained by executing the specific information processing task by the first multiple subjects, and determining an updated processing manner of executing the specific information processing task based on a result of the security analysis; and
  a second submission step of submitting the specific information processing task to second multiple subjects according to the determined updated processing manner, and obtaining information processing results of executing the specific information processing task by the second multiple subjects, wherein each of the second multiple subjects and each of the first multiple subjects save same information associated with the specific information processing task, and the information is updated based on the information processing results of executing the specific information processing task by the second multiple subjects.

APPENDIX 2

The method according to Appendix 1, wherein the specific information processing task is an information processing task associated with a blockchain, the first multiple subjects and the second multiple subjects are execution nodes to which the blockchain relates,
  the first submission step comprises: submitting the information processing task to first multiple execution nodes in the blockchain based on a predetermined strategy, wherein the first multiple subjects correspond to the first multiple execution nodes, and
  the security analysis step and the second submission step comprise:
    receiving results of executing the information processing task which are returned from the first multiple execution nodes;
    selecting at least a part from among the received results, as first results, based on a predetermined rule; and
    obtaining second results through security analysis with respect to the information processing task which is performed based on the first results, and using a list of candidate execution nodes related to the second results as a list of final execution nodes for the information processing task in the blockchain.

APPENDIX 3

The method according to Appendix 2, wherein obtaining the second results through the security analysis with respect to the information processing task comprises:

dynamically changing the predetermined strategy to a strategy having more strict requirements on credit degrees of the execution nodes, as the updated processing manner, in a case where it is determined that the information processing task is a risk information processing task;

submitting the information processing task to second multiple execution nodes in the blockchain based on the changed strategy, wherein the second multiple subjects correspond to the second multiple execution nodes; and receiving results of executing the information processing task which are returned from the second multiple execution nodes, and selecting at least a part from among the results received from the second multiple execution nodes as second results based on the predetermined rule.

APPENDIX 4

The method according to Appendix 3, wherein a risk score of the information processing task is computed based on an operation risk score of the information processing task and a risk score of a node which submits the information processing task, to determine whether or not the information processing task is a risk information processing task.

APPENDIX 5

The method according to Appendix 4, wherein a risk score of the information processing task is further computed based also on an authority risk score of a role of the execution node.

APPENDIX 6

The method according to Appendix 4, wherein the changed strategy is generated by the steps of:
based on a risk grade of the information processing task which corresponds to the risk score of the information processing task, computing the total count of candidate organization nodes and the total count of execution nodes which are needed to generate the list of candidate execution nodes, wherein each organization node comprises multiple nodes;
based on an organization credit score of each candidate organization node and an overall credit score of the candidate organization nodes, computing a weight occupied by each candidate organization node when generating the list of candidate execution nodes;
based on the weight of each candidate organization node and the total count of the execution nodes, computing the count of execution nodes in each candidate organization node which are needed to generate the list of candidate execution nodes; and
generating the changed strategy according to the count of the execution nodes in each candidate organization node which are needed to generate the list of candidate execution nodes.

APPENDIX 7

The method according to Appendix 2, wherein selecting the first results from among the received results based on the predetermined rule comprises:
selecting same read and write sets whose count is in a highest proportion in the total count of read and write sets, as the first results, from among the received results, the highest proportion being greater than a predetermined value.

APPENDIX 8

The method according to Appendix 7, wherein
read and write sets in the received results which are different from read and write sets in the first results are regarded as erroneous results, and
execution nodes returning the erroneous results are judged as misbehavior nodes.

APPENDIX 9

The method according to Appendix 2, wherein in a case where it is determined in the security analysis with respect to the information processing task that the information processing task is not a risk information processing task, the first results are used as the second results, and the first multiple nodes are used as the list of final execution nodes.

APPENDIX 10

An apparatus for processing information by cooperation of multiple subjects, comprising:
a first submission unit configured to submit a specific information processing task to first multiple subjects;
a security analysis unit configured to perform security analysis with respect to information processing results obtained by executing the specific information processing task by the first multiple subjects, and to determine an updated processing manner of executing the specific information processing task based on a result of the security analysis; and
a second submission unit configured to submit the specific information processing task to second multiple subjects according to the determined updated processing manner, and to obtain information processing results of executing the specific information processing task by the second multiple subjects, wherein each of the second multiple subjects and each of the first multiple subjects save same information associated with the specific information processing task, and the information is updated based on the information processing results of executing the specific information processing task by the second multiple subjects.

APPENDIX 11

The apparatus according to Appendix 10, wherein the specific information processing task is an information processing task associated with a blockchain, the first multiple subjects and the second multiple subjects are execution nodes to which the blockchain relates,
the first submission unit is further configured to execute the processing in the information processing task submission unit, the security analysis unit and the second submission unit are further configured to execute the processing in the result reception unit, the first result selection unit and the second result obtainment unit,
wherein the information processing task submission unit is configured to submit the information processing task to first multiple execution nodes in the blockchain based on a predetermined strategy, wherein the first multiple subjects correspond to the first multiple execution nodes;

the result reception unit is configured to receive results of executing the information processing task which are returned from the first multiple execution nodes;

the first result selection unit is configured to select at least a part from among the received results, as first results, based on a predetermined rule; and the second result obtainment unit is configured to obtain second results through security analysis with respect to the information processing task which is performed based on the first results, and to use a list of candidate execution nodes related to the second results as a list of final execution nodes for the information processing task in the blockchain.

APPENDIX 12

The apparatus according to Appendix 11, wherein the second result obtainment unit is further configured to obtain the second results through the processing of:

dynamically changing the predetermined strategy to a strategy having more strict requirements on credit degrees of the execution nodes, as the updated processing manner, in a case where it is determined that the information processing task is a risk information processing task;

submitting the information processing task to second multiple execution nodes in the blockchain based on the changed strategy, wherein the second multiple subjects correspond to the second multiple execution nodes; and receiving results of executing the information processing task which are returned from the second multiple execution nodes, and selecting at least a part from among the results received from the second multiple execution nodes, as second results, based on the predetermined rule.

APPENDIX 13

The apparatus according to Appendix 12, wherein the second result obtainment unit is further configured to: compute a risk score of the information processing task based on an operation risk score of the information processing task and a risk score of a node which submits the information processing task, to determine whether or not the information processing task is a risk information processing task.

APPENDIX 14

The apparatus according to Appendix 13, wherein the second result obtainment unit is further configured to compute a risk score of the information processing task based also on an authority risk score of a role of the execution node.

APPENDIX 15

The apparatus according to Appendix 13, wherein the second result obtainment unit is further configured to generate the changed strategy through the processing of:

based on a risk grade of the information processing task which corresponds to the risk score of the information processing task, computing the total count of candidate organization nodes and the total count of execution nodes which are needed to generate the list of candidate execution nodes, wherein each organization node comprises multiple nodes;

based on an organization credit score of each candidate organization node and an overall credit score of the candidate organization nodes, computing a weight occupied by each candidate organization node when generating the list of candidate execution nodes;

based on the weight of each candidate organization node and the total count of the execution nodes, computing the count of execution nodes in each candidate organization node which are needed to generate the list of candidate execution nodes; and generating the changed strategy according to the count of the execution nodes in each candidate organization node which are needed to generate the list of candidate execution nodes.

APPENDIX 16

The apparatus according to Appendix 11, wherein the first result selection unit is further configured to select the first results through the processing of:

selecting same read and write sets whose count is in a highest proportion in the total count of read and write sets, as the first results, from among the received results, the highest proportion being greater than a predetermined value.

APPENDIX 17

The apparatus according to Appendix 16, wherein the first result selection unit is further configured to:

regard, as erroneous results, read and write sets in the received results which are different from read and write sets in the first results, and judge, as misbehavior nodes, execution nodes returning the erroneous results.

APPENDIX 18

The apparatus according to Appendix 11, wherein the second result obtainment unit is further configured to: in a case where it is determined in the security analysis with respect to the information processing task that the information processing task is not a risk information processing task, use the first results as the second results, and use the first multiple nodes as the list of final execution nodes.

APPENDIX 19

A method for verifying an information processing task in a blockchain based on the second results obtained by the method according to any one of Appendixes 2 to 9, comprising:

on each node in the blockchain, performing a judgment as to whether or not the information processing task is valid, based on the second results and a key value database of the node.

APPENDIX 20

The method according to Appendix 19, wherein, if a read set version in the second results is inconsistent with a read set version from the key value database of the node, a relationship between a read key and a write key of the information processing task is analyzed, in a case where the read key and the write key of the information processing task are associated, it is judged that the information processing task is invalid, and in a case where the read key and the write key of the information processing task are not associated, it is judged that the information processing task is valid.

The invention claimed is:

1. A method for processing information by cooperation of multiple subjects, comprising:
   a first submitting of an information processing task to first multiple subjects;
   performing a security analysis with respect to first information processing results obtained by executing the information processing task by the first multiple subjects, and determining an updated processing manner of executing the information processing task based on a result of the security analysis; and
   a second submitting of the information processing task to second multiple subjects according to the determined updated processing manner, and obtaining second information processing results of executing the information processing task by the second multiple subjects,
   wherein each of the second multiple subjects and each of the first multiple subjects save same information associated with the information processing task, and the information is updatable based on the second information processing results of the second multiple subjects.

2. The method according to claim 1, wherein the information processing task is an information processing task associated with a blockchain, the first multiple subjects and the second multiple subjects are execution nodes to which the blockchain relates,
   the first submitting comprises submitting the information processing task to the first multiple execution nodes in the blockchain based on a determined strategy, wherein the first multiple subjects correspond to the first multiple execution nodes, and
   the performing of the security analysis and the second submitting comprise:
      receiving the first information processing results of executing the information processing task from the first multiple execution nodes;
      selecting at least a part from among the received first information processing results, as first candidate results, based on a determined rule; and
      obtaining second candidate results through the security analysis with respect to the first candidate results of the information processing task, and using a list of candidate execution nodes related to the second candidate results as a list of final execution nodes for the information processing task in the blockchain.

3. The method according to claim 2, wherein the obtaining the second candidate results through the security analysis comprises:
   to update the processing manner, dynamically changing the determined strategy to a changed strategy having more strict requirements on credit degrees of the execution nodes, when determined that the information processing task is a risk information processing task;
   submitting the information processing task to the second multiple execution nodes in the blockchain based on the changed strategy, wherein the second multiple subjects correspond to the second multiple execution nodes; and
   receiving the second information processing results of executing the information processing task from the second multiple execution nodes, and selecting at least a part from among the second information processing results received from the second multiple execution nodes as the second candidate results based on the determined rule.

4. The method according to claim 3, wherein a risk score of the information processing task is computed based on an operation risk score of the information processing task and a risk score of a node which submits the information processing task, to determine whether the information processing task is the risk information processing task.

5. The method according to claim 4, wherein the risk score of the information processing task is further computed based on an authority risk score of a role of the execution node.

6. The method according to claim 4, wherein the changed strategy is generated by:
   based on a risk grade of the information processing task which corresponds to the risk score of the information processing task, computing a total count of candidate organization nodes and a total count of execution nodes which are needed to generate the list of candidate execution nodes, wherein each organization node comprises multiple nodes;
   based on an organization credit score of each candidate organization node and an overall credit score of the candidate organization nodes, computing a weight occupied by each candidate organization node when generating the list of candidate execution nodes;
   based on the weight of each candidate organization node and the total count of the execution nodes, computing the count of execution nodes in each candidate organization node which are needed to generate the list of candidate execution nodes; and
   generating the changed strategy according to the count of the execution nodes in each candidate organization node which are needed to generate the list of candidate execution nodes.

7. The method according to claim 2, wherein the first and second information processing results of executing the information processing task by the first and second multiple execution nodes includes a plurality of read and write sets, and the selecting the at least a part of the first information processing results from among the received first information processing results based on the determined rule comprises:
   selecting same read and write sets whose count is in a highest proportion in a total count of read and write sets, as the first candidate results, from among the received first information processing results, the highest proportion being greater than a determined value.

8. The method according to claim 7, wherein
   read and write sets in the received first information processing results which are different from read and write sets in the first candidate results are indicated as erroneous results, and
   execution nodes returning erroneous results are determined as misbehavior nodes.

9. The method according to claim 2, wherein where it is determined in the security analysis with respect to the information processing task that the information processing task is not a risk information processing task, the first candidate results are used as the second candidate results and the first multiple execution nodes are used as the list of final execution nodes.

10. An apparatus to process information by cooperation of multiple subjects, comprising:

a memory; and a processor coupled to the memory and to,
submit an information processing task to first multiple subjects;
perform a security analysis with respect to first information processing results obtained by executing the information processing task by the first multiple subjects, and to determine an updated processing manner of executing the information processing task based on a result of the security analysis; and
submit the information processing task to second multiple subjects according to the determined updated processing manner, and to obtain second information processing results of executing the information processing task by the second multiple subjects,
wherein each of the second multiple subjects and each of the first multiple subjects save same information associated with the information processing task, and the information is updatable based on the second information processing results of the second multiple subjects.

11. The apparatus according to claim 10, wherein the information processing task is an information processing task associated with a blockchain, the first multiple subjects and the second multiple subjects are execution nodes to which the blockchain relates,
wherein the processor is to,
submit the information processing task to the first multiple execution nodes in the blockchain based on a determined strategy, wherein the first multiple subjects correspond to the first multiple execution nodes;
receive the first information processing results of executing the information processing task from the first multiple execution nodes;
select at least a part from among the received first information processing results, as first candidate results, based on a determined rule; and
obtain second candidate results through the security analysis with respect to the first candidate results of the information processing task, and to use a list of candidate execution nodes related to the second candidate results as a list of final execution nodes for the information processing task in the blockchain.

12. The apparatus according to claim 11, wherein the processor is to obtain the second candidate results through the security analysis by:
to perform the updating of the processing manner, dynamically changing the determined strategy to a changed strategy having more strict requirements on credit degrees of the execution nodes, when determined that the information processing task is a risk information processing task;
submitting the information processing task to the second multiple execution nodes in the blockchain based on the changed strategy, wherein the second multiple subjects correspond to the second multiple execution nodes; and
receiving the second information processing results of executing the information processing task from the second multiple execution nodes, and selecting at least a part from among the second information processing results received from the second multiple execution nodes as the second candidate results based on the determined rule.

13. The apparatus according to claim 12, wherein the processor is to:

compute a risk score of the information processing task based on an operation risk score of the information processing task and a risk score of a node which submits the information processing task, to determine whether the information processing task is the risk information processing task.

14. The apparatus according to claim 13, wherein the processor is to compute the risk score of the information processing task based also on an authority risk score of a role of the execution node.

15. The apparatus according to claim 13, wherein the processor is to generate the changed strategy by:
based on a risk grade of the information processing task which corresponds to the risk score of the information processing task, computing a total count of candidate organization nodes and a total count of execution nodes which are needed to generate the list of candidate execution nodes, wherein each organization node comprises multiple nodes;
based on an organization credit score of each candidate organization node and an overall credit score of the candidate organization nodes, computing a weight occupied by each candidate organization node when generating the list of candidate execution nodes;
based on the weight of each candidate organization node and the total count of the execution nodes, computing the count of execution nodes in each candidate organization node which are needed to generate the list of candidate execution nodes; and
generating the changed strategy according to the count of the execution nodes in each candidate organization node which are needed to generate the list of candidate execution nodes.

16. The apparatus according to claim 11, wherein the first and second information processing results of executing the information processing task by the first and second multiple execution nodes includes a plurality of read and write sets, and the processor is to select the at least a part of the first information processing results from among the received first information processing results based on the determined rule by:
selecting same read and write sets whose count is in a highest proportion in a total count of read and write sets, as the first candidate results, from among the received first information processing results, the highest proportion being greater than a determined value.

17. The apparatus according to claim 16, wherein the processor is to indicate, as erroneous results, the read and write sets in the received first information processing results which are different from read and write sets in the first candidate results, and
determine, as misbehavior nodes, execution nodes returning the erroneous results.

18. The apparatus according to claim 11, wherein where it is determined in the security analysis with respect to the information processing task that the information processing task is not a risk information processing task, use the first candidate results as the second candidate results and use the first multiple execution nodes as the list of final execution nodes.

19. A method for verifying an information processing task in a blockchain based on the second candidate results obtained by the method according to claim 2, comprising:
on each node in the blockchain, performing a judgment as to whether the information processing task is valid, based on the second candidate results and a key value database of the node.

20. The method according to claim 19, wherein,
if a read set version in the second candidate results is inconsistent with a read set version from the key value database of the node, a relationship between a read key and a write key of the information processing task is analyzed,
in a case where the read key and the write key of the information processing task are associated, it is judged that the information processing task is invalid, and
in a case where the read key and the write key of the information processing task are not associated, it is judged that the information processing task is valid.

\* \* \* \* \*